(12) United States Patent
Bradshaw et al.

(10) Patent No.: US 11,436,684 B2
(45) Date of Patent: *Sep. 6, 2022

(54) SYSTEM AND METHOD FOR ONLINE AUTOMOBILE INSURANCE QUOTING

(71) Applicant: Truist Bank, Charlotte, NC (US)

(72) Inventors: Brandon Bradshaw, Raleigh, NC (US); Kenneth Gray Nester, II, Fort Mill, SC (US); Gregory Velett, Tarpon Springs, FL (US); Patricia M. Kinney, Cary, NC (US)

(73) Assignee: Truist Bank, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/983,381

(22) Filed: Aug. 3, 2020

(65) Prior Publication Data

US 2020/0364803 A1  Nov. 19, 2020

Related U.S. Application Data

(63) Continuation of application No. 15/169,042, filed on May 31, 2016, now abandoned, which is a continuation of application No. 13/672,798, filed on Nov. 9, 2012, now abandoned, which is a continuation-in-part of application No. 13/468,249, filed on May 10, 2012, now Pat. No. 8,793,147.

(Continued)

(51) Int. Cl.
*G06Q 30/00* (2012.01)
*G06Q 40/08* (2012.01)
(Continued)

(52) U.S. Cl.
CPC ............ *G06Q 40/08* (2013.01); *G06Q 20/10* (2013.01); *G06Q 30/0611* (2013.01); *G06Q 30/0623* (2013.01)

(58) Field of Classification Search
CPC ...................................................... G06Q 40/08
(Continued)

(56) References Cited

U.S. PATENT DOCUMENTS

| 5,191,522 | A  | 3/1993  | Bosco et al. |
| 6,598,026 | B1 | 7/2003  | Ojha et al. |
| 7,376,613 | B1 | 5/2008  | Cofino et al. |
| 7,844,503 | B2 | 11/2010 | Fogelson |
| 8,019,644 | B2 | 9/2011  | Libman |

(Continued)

OTHER PUBLICATIONS

ProQuestNPLSearch History.*
ProQuestDialogNPL Search History.*

*Primary Examiner* — John H. Holly
(74) *Attorney, Agent, or Firm* — Kilpatrick Townsend & Stockton LLP; Michael A. Springs, Esq.

(57) ABSTRACT

The present disclosure describes novel systems and methods for a customer to receive information and/or purchase a product or service while interacting with multiple vendors through a single contact/agency. The customer is able to communicate with the agency through a variety of communication modes. The agency adapts the customer's input as necessary to meet the requirements of the vendors and the agency returns information to the customer so that the customer can conveniently interact with the multiple vendors. The systems and methods allow for the customer to stop and restart the process at various points using any of the communication modes. The agency has the ability to present the customer with prospecting, sales, service, upgrades, cross-sells, and other pre- and post-purchase services at the single point-of-contact agency.

13 Claims, 12 Drawing Sheets

Related U.S. Application Data

(60) Provisional application No. 61/557,750, filed on Nov. 9, 2011.

(51) Int. Cl.
*G06Q 30/06* (2012.01)
*G06Q 20/10* (2012.01)

(58) Field of Classification Search
USPC .............. 705/4, 1.1, 38, 37, 14.17, 26.41, 5; 235/455, 381, 383
See application file for complete search history.

(56) References Cited

U.S. PATENT DOCUMENTS

| | | |
|---|---|---|
| 8,099,365 B2 | 1/2012 | Bhambri et al. |
| 2002/0116231 A1 | 8/2002 | Hele et al. |
| 2002/0120474 A1 | 8/2002 | Hele et al. |
| 2006/0004642 A1 | 1/2006 | Libman |
| 2007/0244728 A1 | 10/2007 | Jenkins |
| 2009/0094066 A1* | 4/2009 | Freudman .............. G06Q 10/10 705/4 |
| 2009/0164258 A1 | 6/2009 | Broodryk |
| 2009/0210256 A1 | 8/2009 | Upadhyayula et al. |
| 2009/0210259 A1 | 8/2009 | Cardot et al. |
| 2010/0070407 A1 | 3/2010 | Rose et al. |
| 2010/0125466 A1* | 5/2010 | Labelle ................. G06Q 40/08 705/4 |
| 2010/0324942 A1 | 12/2010 | Rogers et al. |
| 2011/0022419 A1 | 1/2011 | Ziade et al. |
| 2012/0197667 A1 | 8/2012 | Reid |
| 2012/0197668 A1 | 8/2012 | Reid |

\* cited by examiner

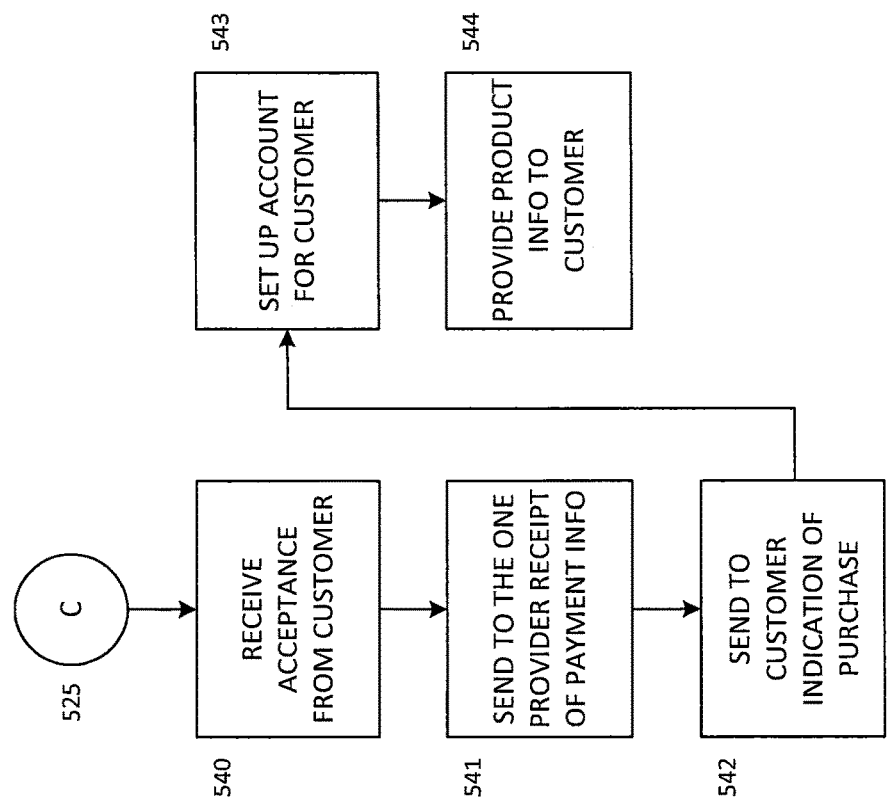

SYSTEM AND METHOD FOR ONLINE AUTOMOBILE INSURANCE QUOTING

RELATED AND CO-PENDING APPLICATIONS

This application is a continuation of and claims priority to application entitled "System and Method for Online Automobile Insurance Quoting", Ser. No. 15/169,042 filed 31 May 2016, which is a continuation of and claims priority to application entitled "System and Method for Online Automobile Insurance Quoting", Ser. No. 13/672,798 filed 9 Nov. 2012, which (1) is a continuation-in-part of and claims priority to the application entitled "System and Method for Online Agency", Ser. No. 13/468,249 filed 10 May 2012, now U.S. Pat. No. 8,793,147, and (2) also claims priority to the provisional application entitled "System and Method for Online Automobile Insurance Quoting System", Ser. No. 61/557,750 filed 9 Nov. 2011. The entirety of each of the above applications is hereby incorporated herein by reference.

BACKGROUND

Electronic commerce has made it easier for a consumer to obtain information and/or make a purchase of a product or service from an online seller. However, if the customer desires to compare the products/services offered by different sellers, the customer usually must interface with each seller's website one at a time in order to determine which seller's product/service is the one best suited to the customer's needs. At each interface, the customer must enter information, data, preferences, and the like which can be tedious and time consuming. Additionally, each of the sellers may have certain restrictions or limitations on their products/services such that the customer must alter his or her criteria for each seller thus making the ultimate comparison between the various products/services overly complicated. Furthermore, there is generally only one mode of communication available to the customer for any particular seller, e.g., online, telephonic, in person, etc. thus making the process inconvenient and time-consuming as the customer must finish the interaction once it is begun or risk having to restart the interaction from the beginning.

Another problem faced by the consumer is that pre-purchase and after-purchase resources of typical online sellers are offered in a disjoint manner thereby requiring the consumer to maintain separate contact points for such things as cross-sell benefits and opportunities, follow-up servicing for the purchased product/service, and potential future upgrades or downgrades as the consumer may desire. Since these, and other, pre-purchase and post-purchase services are usually an important consideration to a consumer when deciding to make a purchase, the inability to adequately take these services into account due to the arrangement of typical online businesses places a serious burden on the consumer. The resulting inefficiencies of making a purchase usually works to the detriment of the consumer as he or she, being daunted by the effort necessary to adequately vet a purchase, must make a decision based on incomplete, or perhaps even misleading, information.

The present disclosure describes novel systems and methods for overcoming the above-mentioned problems and shortcomings faced by a modern consumer. The present disclosure describes novel systems and methods for a customer to receive information and/or purchase a product or service while interacting with multiple vendors through a single contact/agency. The customer is able to communicate with the agency, which is typically an online agency, through a variety of communication modes. As used herein, an "online agency" includes a system and methods therefor which can communicate with both customers and vendors via any electronic (wired and/or wireless) communication mode including, but not limited to, online channels (e.g., from desktop computers, laptop computers, tablet computers, mobile telephones, text messaging, instant messaging, etc.), offline channels, telephonic channels (wired or wireless), or combinations thereof. The online agency adapts the customer's input as necessary to meet the requirements of the vendors and the online agency returns information to the customer so that the customer can conveniently interact with the multiple vendors. The online agency may also create packages from the information received from the vendors and present these packages to the customer to ease the customer's burden of reviewing an abundance of information. The systems and methods allow for the customer to stop and restart the process at various points using various communication modes. The online agency has the ability to present the customer with prospecting, sales, service, upgrades, cross-sells, up-sells, and other pre- and post-purchase services at the single point-of-contact agency. Thus, the efficiency of the information-gathering evolution for the consumer is greatly increased and the consumer is conveniently presented with relevant information without having to individually perform tedious information-gathering for each of the relevant prospective sellers.

Accordingly, it is an object of the present disclosure to provide a system for providing information to a customer, from one or more predetermined sellers via one intermediary (or "online") agency, for choosing a product. The system includes a first module for receiving from a customer a first set of information regarding a product, such as, but not limited to, a customer request for an online quote for a product or service and/or a customer request to purchase online the product or service, customer-specific information and requirements, an identification of the customer, an online banking identification of the customer, if such identification exists, etc. The system also includes a second module, which is operatively connected to the first module, for providing a second set of information to the customer based on the received first set of information. The second set of information may contain more specific information regarding the product/service desired by the customer. As a non-limiting example, if the customer is interested in purchasing a car insurance policy, the second set of information may contain requests such as the type and number of vehicles owned by the customer, whether the customer rents or owns his or her home, etc. In an embodiment, the second set of information includes information required by at least one of the one or more predetermined sellers. In a further embodiment, the second set of information includes information unique to one of the one or more predetermined sellers. As a non-limiting example, one insurance seller may have a limit on the number of incidents a person may have, above which that insurance seller may not sell insurance to that person, whereas another insurance seller may have a different limit on the number of incidents. As another non-limiting example, one insurance seller may have a limit on the number of drivers per insurance policy and/or the number of vehicles per policy, whereas another insurance seller may have different limits for one or both of drivers per policy and vehicles per policy. As yet another non-limiting example, one insurance seller may require either the full or partial Vehicle Identification Number ("VIN") early in the processing of an insurance selling transaction while another insurance seller may not require the full or partial VIN until later in the selling transaction. One of skill in the art will readily understand that other differences between the predetermined sellers need to be taken into account and managed by the online agency in order to simplify the customer's choice of the desired product or service. The system also includes a third module, which is operatively connected to the first module, for receiving and processing first customer data regarding the desired product. Continuing with the non-limiting car insurance example, the first customer data typically contains information specific to the desired car insurance, such as the type and amount of car insurance coverage desired, and may contain information such as a desired deductible limit and/or a desired maximum premium payment. This "raw" information received from the customer may need to be processed by the online agency so that the various predetermined insurance agencies with whom the online agency will be interfacing will be able to return insurance information for the customer that is relevant to the customer's request. The system also includes a fourth module, which is operatively connected to the third module and to the one or more predetermined product providers, where the fourth module sends first processed customer data to the one or more product providers and receives first product data from the one or more product providers in response to the first processed customer data. Still continuing with the non-limiting insurance example, the first product data typically contains insurance quote information which is based on the first processed customer data.

In another non-limiting example, the first customer data may contain information for servicing an existing car insurance policy, such as adding a new vehicle, adding a new driver, renewing a policy, etc. This "raw" information, just like in the example above, may need to be processed by the online agency so the one or more selected predetermined insurance agencies with whom the online agency will be interfacing will be able to return the proper information for the customer that is relevant to the customer's request. Likewise, the information that is returned to the online agency from the insurance agency may need to be processed by the online agency so that the proper information may be sent to the customer in a format with which the customer is familiar and/or desires.

Additionally, the third module sends the first product data to the customer and receives a product choice from the customer in response to the first product data. The third module also receives and processes second customer data regarding the customer's product choice. As a non-limiting example, the second customer data may include revisions to the customer's original insurance coverage requests made in the first customer data, such as a change in the type and/or amount of coverage, desired deductible limit, and/or a desired maximum premium payment. The second customer data typically, but not necessarily, is in response to the information in the first product data. The fourth module also sends the second processed customer data to one of the product providers associated with the customer's product choice, and receives from the one product provider second product data in response to the second processed customer data. The third module also processes the second product data and sends the second product data to the customer.

Optionally, the third module receives from the customer an acceptance of the second product data where the acceptance includes customer payment information; the fourth module sends to the one product provider an indication of receipt of the customer payment information; and the third module sends to the customer an indication of purchase of the product choice, such as, but not limited to, an ID card.

It is a further object of the present disclosure to provide a system for providing information to a customer, from one or more predetermined sellers via one intermediary (or "online") agency, for choosing a product. The system includes a first module for receiving from a customer a first set of information regarding a product, such as, but not limited to, a customer request for an online quote for a product or service including customer-specific information and requirements, an identification of the customer, an online banking identification of the customer, if such identification exists, etc. The system also includes a second module, which is operatively connected to the first module, for providing a second set of information to the customer based on the received first set of information. The second set of information may contain more specific information regarding the product/service desired by the customer. As a non-limiting example, if the customer is interested in purchasing a car insurance policy, the second set of information may contain requests such as the type and number of vehicles owned by the customer, whether the customer rents or owns his or her home, etc. The system also includes a third module, which is operatively connected to the first module, for receiving, via the first module, first customer data regarding the desired product and for processing the first customer data. Continuing with the non-limiting car insurance example, the first customer data typically contains information specific to the desired car insurance, such as the type and amount of car insurance coverage desired, and may contain information such as a desired deductible limit and/or a desired maximum premium payment. This "raw" information received from the customer may need to be processed by the online agency so that the various predetermined insurance agencies with whom the online agency will be interfacing will be able to return insurance information for the customer that is relevant to the customer's request. The system also includes a fourth module, which is operatively connected to the third module and to the one or more predetermined product providers, where the fourth module sends first processed customer data to the one or more product providers and receives first product data from the one or more product providers in response to the first processed customer data. Still continuing with the non-limiting insurance example, the first product data typically contains insurance quote information which is based on the first processed customer data.

In another non-limiting example, the first customer data may contain information for servicing an existing car insurance policy, such as adding a new vehicle, adding a new driver, renewing a policy, etc. This "raw" information, just like in the example above, may need to be processed by the online agency so the one or more selected predetermined insurance agencies with whom the online agency will be interfacing will be able to return the proper information for the customer that is relevant to the customer's request. Likewise, the information that is returned to the online agency from the insurance agency may need to be processed by the online agency so that the proper information may be sent to the customer in a format with which the customer is familiar and/or desires.

Additionally, the third module sends the first product data to the customer, via the first module, and receives a product choice from the customer, via the first module, in response to the first product data. The third module also receives, via the first module, second customer data regarding the customer's product choice and processes, if necessary, the second customer data. The fourth module also sends the second processed customer data to one of the product providers associated with the customer's product choice, and receives from the one product provider second product data in response to the second processed customer data. The third module also processes the second product data and sends the second product data to the customer via the first module.

Optionally, the third module receives from the customer, via the first module, an acceptance of the second product data where the acceptance includes customer payment information; the fourth module sends to the one product provider an indication of receipt of the customer payment information; and the third module sends to the customer, via the first module, an indication of purchase of the product choice, such as, but not limited to, an ID card.

It is still a further object of the present disclosure to provide information from a business to a customer for assisting the customer in choosing a product. The method includes: receiving from a customer a first set of information regarding a product, where the first set of information is received via a first computer interface communicating with the customer over a computer network; providing a second set of information to the customer via said first computer interface based on the received first set of information; receiving first customer data regarding said product; processing, using a microprocessor, the first customer data; sending the processed first customer data to one or more product providers via a second computer interface; receiving, via said second computer interface, a reply from at least one of the one or more product providers in response to the processed first customer data; determining if the reply includes first product data and if so, sending, via said first computer interface, the first product data to said customer; receiving, via said first computer interface, a product choice and second customer data regarding the product choice from the customer in response to said first product data; processing, using said microprocessor, the second customer data; sending, via said second computer interface, the processed second customer data to one of the product providers associated with the product choice and for receiving from the one product provider, via the second computer interface, second product data in response to the processed second customer data; processing, using said microprocessor, the second product data; and sending the processed second data, via said first computer interface, to the customer.

Additionally, further embodiments of the present subject matter include: receiving from the customer an acceptance of the second product data including customer payment information; sending to the one product provider an indication of receipt of the customer payment information; and sending to the customer an indication of purchase of the product choice.

As with the previous example, the first customer data may contain information for servicing an existing car insurance policy, such as adding a new vehicle, adding a new driver, renewing a policy, etc. This "raw" information, just like in the example above, may need to be processed by the online agency so the one or more selected predetermined insurance agencies with whom the online agency will be interfacing will be able to return the proper information for the customer that is relevant to the customer's request. Likewise, the information that is returned to the online agency from the insurance agency may need to be processed by the online agency so that the proper information may be sent to the customer in a format with which the customer is familiar and/or desires.

In another embodiment of the present subject matter, if the determination of whether the reply includes first product data results in finding that the reply does not contain first product data, then sending to the customer a notification that no product data was received; receiving and processing third customer data regarding said product and sending the processed third customer data to the one or more product providers; and receiving first product data from the one or more providers. Alternatively, if the determination of whether the reply includes first product data results in finding that the reply does not contain first product data, then receiving at a customer contact sales center a telephone call from the customer; recommending to the customer changes to the first customer data; and processing the first customer data and providing the customer with first product data.

Still other embodiments of the present subject matter further include setting up an account for the customer with the business; and providing product information to the customer based on the product choice.

Further embodiments of the present subject matter further include determining if the customer is an online client of the business; determining a status of the customer if the customer is not a current online client of the business or if said first set of information is not verified by the business, including determining if the customer is an offline client of the business and if so, presenting a first content to the customer, otherwise flagging the customer as a pending customer; and establishing for the customer credentials which allow the customer to save a third set of information so that the customer may later resume choosing a product via an online channel, an offline channel, a telephonic channel, and combinations thereof.

Additionally, another embodiment of the present subject matter provides for a method for providing information from a predetermined plurality of competing businesses to a customer for assisting the customer in choosing a product from one of the competing businesses. Aspects of this embodiment include:

receiving from a customer a first set of information regarding the product, wherein the first set of information is received via a first computer interface communicating with the customer over a computer network;

determining, using a microprocessor, a second set of information based at least in part on the received first set of information and on data required by at least one of the predetermined plural competing businesses;

providing, via said first computer interface, the second set of information to the customer;

receiving, via said first computer interface, first customer data regarding said product, wherein the first customer data is based at least in part on the second set of information;

processing, using said microprocessor, the first customer data;

sending, via a second computer interface, the processed first customer data to each of the plural businesses;

receiving, via said second computer interface, a reply from each of the plural businesses, wherein the replies are in response to the processed first customer data;

processing, using the microprocessor, the received replies wherein the processing includes organizing the replies into predetermined categories to thereby form a first product data;

sending, via said first computer interface, the first product data to said customer;

receiving, via said first computer interface, a product choice and second customer data regarding the product choice from the customer in response to said first product data, wherein the product chosen is associated with a first business of the plural businesses;

processing, using said microprocessor, the product choice and the second customer data to thereby form a processed second customer data;

sending, via said second computer interface, the processed second customer data to the first business;

receiving from the first business, via the second computer interface, second product data in response to the processed second customer data;

processing, using said microprocessor, the second product data; and sending the processed second data, via said first computer interface, to the customer.

Yet another embodiment of the present subject matter provides for a method for providing information from a predetermined plurality of competing businesses to a customer for assisting the customer in choosing a product from one of the competing businesses and/or obtaining one or more quotes for the product from one or more of the competing businesses. Aspects of this embodiment include:

receiving from a customer a first set of information regarding the product, wherein the first set of information is received via a first computer interface communicating with the customer over a computer network;

determining, using a microprocessor, a second set of information based at least in part on the received first set of information and on data required by at least one of the predetermined plural competing businesses;

providing, via said first computer interface, the second set of information to the customer;

receiving, via said first computer interface, first customer data regarding said product, wherein the first customer data is based at least in part on the second set of information;

processing, using said microprocessor, the first customer data;

sending, via a second computer interface, the processed first customer data to each of the plural businesses;

receiving, via said second computer interface, a reply from each of the plural businesses, wherein the replies are in response to the processed first customer data;

processing, using the microprocessor, the received replies wherein the processing includes organizing the replies into predetermined categories to thereby form a first product data;

determining from the first set of information, using the microprocessor, whether the intent of the customer is to purchase the product from one of the plural businesses or whether the intent of the customer is to obtain a quote for the product from at least one of the plural business;

if the determination of the customer's intent is to obtain a quote for the product, sending, via said first computer interface, the first product data to said customer and then ending the procedure;

if the determination of the customer's intent is to purchase the product, sending, via said first computer interface, the first product data to said customer;

receiving, via said first computer interface, a product choice and second customer data regarding the product choice from the customer in response to said first product data, wherein the product chosen is associated with a first business of the plural businesses;

processing, using said microprocessor, the product choice and the second customer data to thereby form a processed second customer data;

sending, via said second computer interface, the processed second customer data to the first business;

receiving from the first business, via the second computer interface, second product data in response to the processed second customer data;

processing, using said microprocessor, the second product data; and sending the processed second data, via said first computer interface, to the customer.

The above advantages, as well as many other advantages, of the present disclosure will be readily apparent to one skilled in the art to which the disclosure pertains from a perusal of the claims, the appended drawings, and the following detailed description.

BRIEF DESCRIPTION OF THE DRAWINGS

FIGS. 5A, 5B, 5C, and 5D are flow diagrams for a method for an online agency according to embodiments of the disclosure.

DETAILED DESCRIPTION

Figure 1:
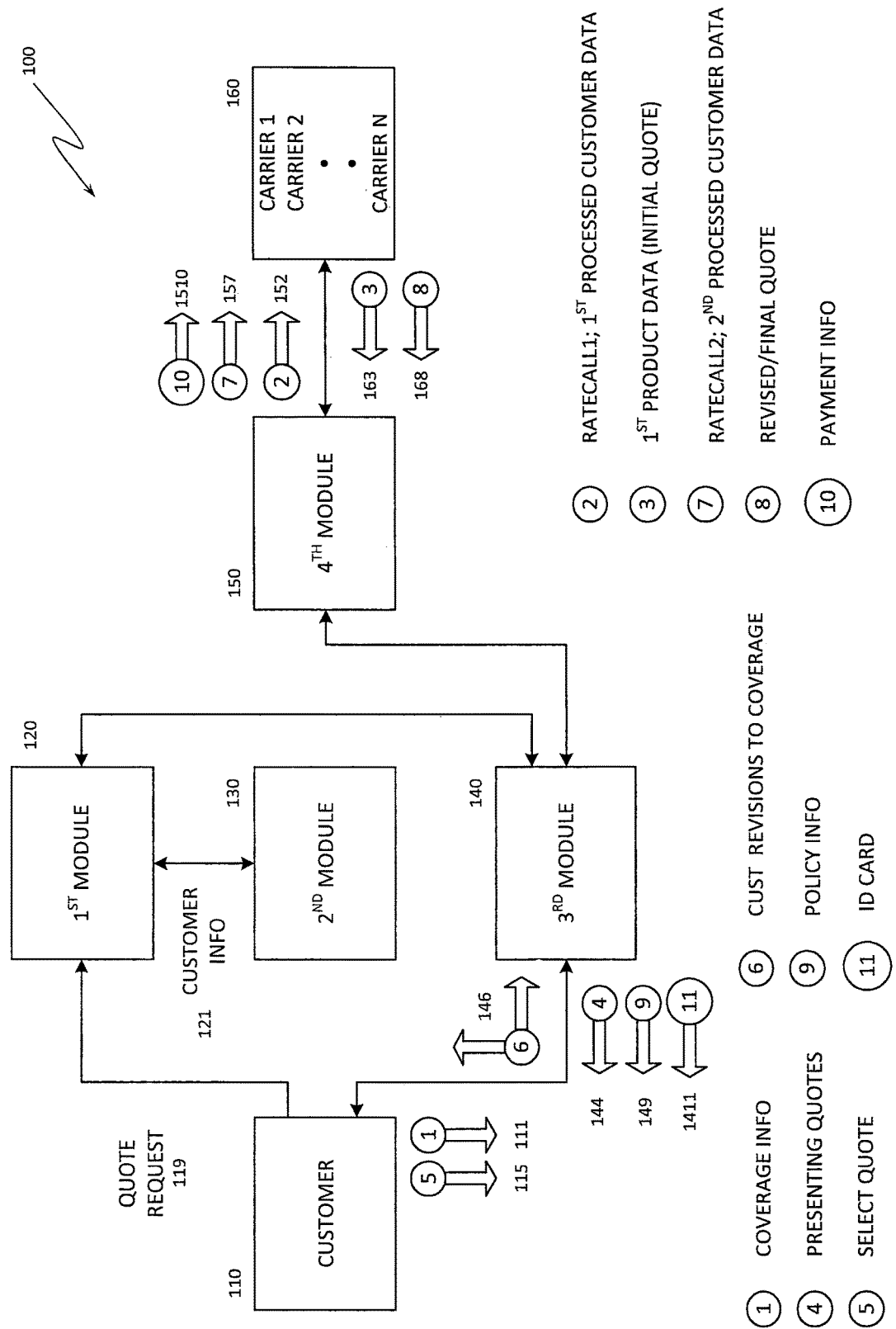
FIG. 1 is a block diagram of a system for an online agency according to an embodiment of the disclosure.

With reference to the figures where like elements have been given like numerical designations to facilitate an understanding of the present subject matter, various embodiments of a system and method for an online agency are described. While the below discussion may at times, for exemplary purposes, discuss the invention in terms of providing information for, purchasing, and servicing an insurance policy, those of skill in the art will readily understand that the breadth and scope of the invention is not so limited and that the agency system and methods disclosed herein are applicable to a broad range of products and services.

The present disclosure describes novel systems and methods for a customer to receive information and/or purchase a product or service while interacting, indirectly, with multiple providers through a single contact/agency. The customer is able to communicate with the agency through a variety of communication modes such as via an online channel, an offline channel, a telephonic channel, or combinations thereof. This flexibility allows the customer to interface with the agency in a manner which meets the customer's needs for security as well as the customer's particular comfort level for communication. For example, the customer may start an insurance application using the online channel, go offline, then resume the application process using the telephonic channel. Data entered by the customer during the online channel transaction is passed to the telephonic service channel personnel so that reentering of data is not required. Thus, the customer is not restricted to just one communication mode for a given process. The customer can use one, two, or more communication modes and switch between them as the customer sees fit. Therefore, the systems and methods described herein allow for the customer to stop and restart the process at various points using various communication modes.

Another benefit of the present subject matter is that the agency with which the customer interacts shoulders the burden of interfacing with various predetermined providers. For example, if the customer is interested in purchasing car insurance, and the agency has, say, three providers of car insurance from which the agency is prepared to request quotes, the three insurance providers may have different requirements for how they receive information for their quotes. As a non-limiting example, if a customer wants $250,000 of comprehensive insurance, and insurance company A only provides comprehensive insurance at every $200,000 level, the agency will process the customer's request and send to the insurance company an appropriate request that best meets the customer's needs. Another example may be based on the type of use for the vehicle, the number of miles driven per day, the number of miles driven annually, etc. Of course, as the number of variables increases between what the customer requests and what the insurance company's requirements are for a quote, the agency must process the customer's request in the most fitting way possible. These variables may include, but are not limited to, discounts offered by various vendors (anti-theft, airbag, anti-lock, multi-car, homeownership, good student, driver training, etc.) For example, the agency may round the customer's request up or down, or determine a "best fit" between different and/or competing requirements, or the agency may take advantage of other information the agency has for the insurance company to provide the customer with a pertinent quote. All of this, and other, processing of the customer's input by the agency is possible since the agency has researched the requirements of the various providers so that the customer does not have to. Additionally, the agency may inform the customer that altering one or more parameters of the customer's request may allow the agency to return a better quote from the insurance company providers. Thus, according to the present subject matter, the agency adapts the customer's input as necessary to meet the requirements of the providers/vendors and the agency returns information to the customer so that the customer can conveniently interact with the multiple vendors.

Various embodiments of the present subject matter allow for the agency's sales, solutions, and service centers to cooperatively interact. The agency has the ability to present the customer with prospecting, sales, service, upgrades, cross-sells (e.g., if the customer has purchased car insurance, the agency can ask the customer if he or she would like to also purchase homeowner's insurance, renter's insurance, etc., either as a package with the car insurance or from a different insurance provider altogether; can also cross-sell financial products and services), up-sells (e.g., inform the customer of coverages they did not select, inform the customer if their insurance purchase is at, below, or above the norm for others who are similar to the customer), and other pre- and post-purchase services at the single point-of-contact agency. As an example, because of this interaction, the customer may, using the one agency interface (with one or more communication channels), service existing policies, purchase a new policy of the same or a different type (e.g., a second car insurance policy or a new homeowner's policy), add a driver or a vehicle to a car insurance policy, add a scheduled property coverage, request new insurance documentation, communicate with the agency through e-mail, chat, click to call, phone, etc. As a further example, if the customer has purchased an insurance policy from an insurance provider, via the agency, in order to renew the policy the customer need only interface with the agency rather than the insurance provider, as required by typical prior art systems. Thus, the agency can build brand loyalty throughout the entire purchase and servicing process.

Post processing services offered by the agency, usually handled by the agency's service sector, require an information flow similar to the information flow for sales services offered by the agency. With the service portion, the agency would have an interface, system, and process flow akin to that described herein for the agency's sales interface, system and process flow. Just like the for the sales sector, the agency must build the interfaces with each of the carriers/vendors the agency will support in the service arena and these interface service calls would vary from carrier to carrier. As a non-limiting example, to add a vehicle with carrier A the agency may have to send to carrier A information regarding vehicle identification number ("VIN"), model year, and make and model; while for carrier B the agency may only need to send a VIN. A customer and/or client (as a non-limiting example, a client of an online bank) can enter his/her user ID and password with the agency over an appropriate communication channel, and perform any number of actions, such as, but not limited to: a view policy summary, a view policy document, make a payment, add/remove a vehicle (or other property) from a policy, add/remove a driver, receive targeted cross sell offers, etc.

Thus, the efficiency of the information-gathering evolution for the consumer is greatly increased and the consumer is conveniently presented with relevant information without having to individually perform tedious information-gathering for each of the relevant prospective sellers.

With attention directed towards FIG. 1, system 100 represents a block diagram of a system for an online agency according to an embodiment of the disclosure. Block 110 represents a customer who is interested in receiving information for choosing a product or service and prefers to receive pertinent information while avoiding unnecessary duplication of effort in connecting to various provides of the product/service one after another. The customer 110 initiates a process for receiving information for choosing a product, servicing a previously-purchased product, choosing a cross-sell product, or any other like matter. As stated above, while the discussion herein will be directed towards purchasing an insurance policy, those of skill in the art will readily understand that the present subject matter is not so limited. The customer 110 transmits a quote request 119 to a first module 120 of the agency's system. The first module 120 may be a computer network interface program or similar hardware/software. The request may include information for an insurance quote, may include an online ID that has been assigned to the customer by the agency, and may include the customer's name, address, zip code, date of birth, and other personal identifying information. The agency may be a financial institution and the online ID may be an online banking ID. The agency's system may, through a second module 130, determine information about the customer, such as matching information. This matching information may be retrieved from the agency's internal databases, from external databases, or both, and may be used for authenticating or establishing credentials for the customer. This information may include, for example, personal information about the customer that the customer did not provide (e.g., address, phone number, zip code, date of birth, driving history, moving violations, arrests, etc.), other information about the customer (e.g., whether the customer is a renter or a home owner, etc.), information regarding the customer's vehicles (e.g., number of vehicles, make, model, year, etc.), and information about existing insurance coverage. Some of this information may be used to prefill fields in a form that will be sent to the customer. The second module 130 then provides to the customer, via the first module, a set of customer information 121 based on the received request from the customer. This set of information sent to the customer typically includes information the agency discovered from the search of its internal and external databases using the second module.

The second module 130 includes a processor, operatively connected to the internal and external databases, which is programmed to determine if the customer is an online client of the agency; determine a status of the customer if the customer is not a current online client of the agency or if the customer information 121 is not verified by the agency, including determining if the customer is an offline client of the agency and if so, presenting an online user ID and password to the customer, otherwise flagging the customer as a pending customer; and establish for the customer credentials which allow the customer to save information relevant to the information gathering or purchasing process so that the customer may later resume gathering information and/or choosing a product via an online channel, an offline channel, a telephonic channel, or combinations thereof.

The agency's system further includes a third module 140 which is operatively connected to the first module 120 and the customer 110. The third module receives coverage information/data 111 from the customer regarding the product the customer is inquiring about. For example, the coverage information 111 includes particulars regarding the customer's desired insurance coverage, such as desired premium payments, desired deductible amounts, desired insurance coverage amounts, etc. Typically, the coverage information 111 received from the customer is information that is readily known to the customer without requiring the customer to stop the online session with the agency in order to look up information. As discussed further below, once a carrier is selected, then the customer is queried for more detailed information, if necessary. The third module, after receiving the coverage information 111, processes, as necessary, the coverage information using a processor so that the various predetermined insurance providers/carriers 160 will return information that is useful to the customer. Since the various carriers 160 may each have different requirements, in order to return to the customer a comprehensive, yet digestible, report of available coverages, the processing done by the third module is important. Additionally this processing, sometimes referred to herein as filtering or a suitability check, is done by the third module 140 provides cost savings for the carriers 160 since the agency can filter out those customers for which the agency knows a particular carrier will not return a quote. This cost savings for the carrier comes about since the carrier will not have to incur inquiry report costs. For example, some carriers 160 may not be licensed to operate in the state the customer is located, one carrier may have levels of coverage that are different than the levels of coverage offered by another carrier, some carriers may require collision coverage and others may not, some carriers may not return a quote based on the customer's driving history, etc. Other examples of processing/filtering include, but are not limited to:

State financial responsibility filing requirements

Customer's traffic violations (e.g., driving under the influence, driving while intoxicated, hit and run, vehicular homicide/manslaughter, etc.)

Customer's driver's license suspension or revocation

If the customer is currently insured

Customer's ratio of drivers to vehicles and vehicles to drivers

The processing done by the third module 140 may also include preselecting insurance coverage packages so as to not inundate the customer with a plethora of choices. Thus, the agency may present to the customer preselected packages which the customer may choose not to take and may instead choose to modify or customize the package. These packages may be based on such parameters as the state the customer's vehicle is registered, the ownership status (e.g., comprehensive and collision coverages are typically required for financed/leased vehicles), violations/claims (e.g., carriers may choose not to offer higher limits to customers with several violations), etc.

In addition, the processing done by the third module 140 may include assembling the information/data received from the customer and discovered about the customer to fit the particular formats of each of the carriers 160. Typically, each carrier has a specific format which differs, either slightly or greatly, from other carriers. While some data mapping elements require input for all carriers, the assembly of the data is based on the carriers' needs. For example, most all carriers require basic information such as the customer's name, address, and zip code, the format or sequence of this information may vary by carrier. For example, if the customer has a current policy with an insurance company named "X Mutual Insurance Company", prospective new insurance company A may need that information in the format "X Mutual Insurance Company" while company B may need the information in the format "X Mutual Ins. Co." while company C may require just "X".

The third module 140, after performing some or all of the processing outlined above, sends the processed customer data/information to a fourth module 150, with which it is operatively connected. The fourth module 150 sends the processed customer data/information 152 to the predetermined carriers 160, with which it is operatively connected. The fourth module 150 may include a computer network interface, as is known in the art. The first through fourth modules, which comprise the agency's system, may be separate hardware and/or software modules or two or more of the modules may be integrated into one overall computer hardware/software module.

The processed customer data/information 152 is received by one or more of the predetermined carriers 160 where each carrier receives the customer data/information 152 in the specific format and with the specific content required for that carrier. One or more of the carriers 160 sends a first set of product data 163, which typically contains an initial quote, to the fourth module 150 which passes the first set of product data 163 to the third module 140.

In certain embodiments of the present subject matter, the third module 140 processes the first set of product data 163 to thereby present the product data to the customer in a user-friendly display which contains only that data which the agency decides is helpful to the customer. For example, the third module 140 may not present information from a particular carrier if that carrier does not provide coverage that meets the customer's needs according to the information the agency has received and/or gathered about the customer. The first set of product data 163 is presented by the third module 140 to the customer 110 as quotes 144 from the carriers.

The third module 140 then typically receives from the customer 110 a selection 115 of one (typically) of the quotes presented. Based on the selected quote, the third module 140 sends to the customer 110 one or more inquiries pertinent to the customer's situation with respect to the desired insurance. These inquiries are specific to the carrier with whom the customer's selection 115 is associated. The customer then provides to the third module a second set of customer data, which may contain the following information. Naturally, if the customer is not satisfied with any of the presented quotes, the customer may modify their initial request and proceed as if the modified request was the customer's initial quote request 119 or the customer's coverage information/data 111. Alternatively, the customer may, based on suggestions from the agency (e.g., a better deal is possible from one of the carriers, selected or otherwise, if the customer modifies their requested coverage), modify their coverage request 146 one or more times and proceed from that point in the process. Again, the third module processes, as necessary, the selected quote and/or information or modified data from the customer (i.e., the second set of customer data).

The third module 140 then sends to the carrier associated with the customer's selected quote 115, via the fourth module 150, the processed (as necessary) second set of customer data 157. The selected carrier then sends to the third module, via the fourth module, a second set of product data which typically includes a revised quote 168 (which may be a final quote and may contain other pertinent insurance policy information for the selected carrier) based on the second set of customer data 157. Again, the third module 140 processes, as necessary, the second set of product data and/or revised quote 168 from the carrier and sends the processed product data/revised quote/policy information to the customer 110.

If the customer 110 so chooses, the customer may accept the final quote from the selected carrier and transmit indicia of that acceptance to the third module 140. The indicia of acceptance may include payment information. Alternatively, the indicia of acceptance may include something other than payment information at which point the third module may transmit payment requirements to the customer who would then send to the third module payment information. The third module 140 would receive the payment information and send to the selected carrier an indication of receipt of the payment information 1510. The third module 150 would then send to the customer 110 an indication of purchase 1411 of the chosen product which may include an ID card.

The agency is typically an online-capable business and in some embodiments, the online-capable business is a financial institution, a bank, a subsidiary of a financial institution, a company affiliated with a financial institution, or combinations thereof.

Figure 2:
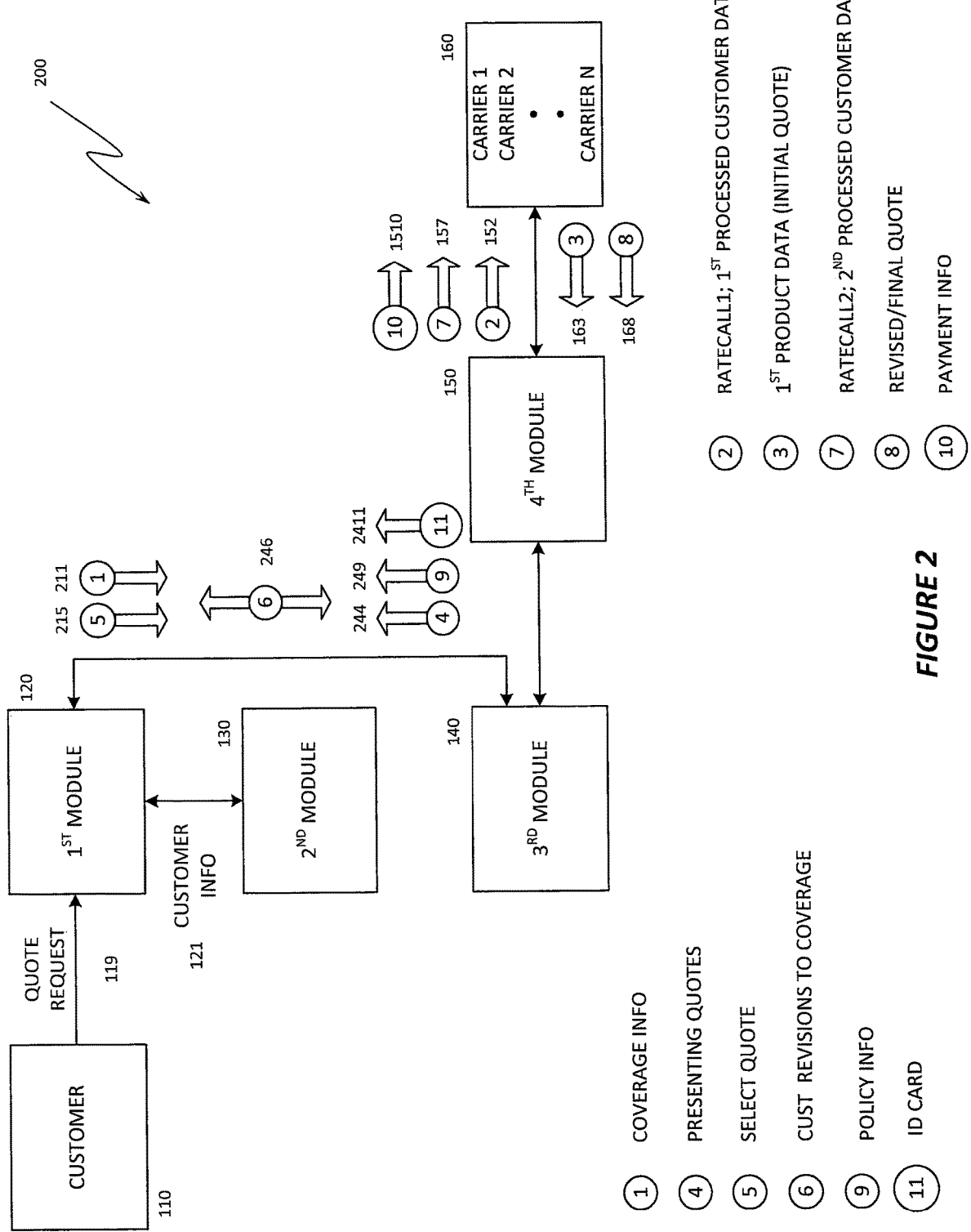
FIG. 2 is a block diagram of a system for an online agency according to another embodiment of the disclosure.

Now considering FIG. 2, system 200 represents a block diagram of a system for an online agency according to an embodiment of the disclosure. System 200 differs from system 100 in that all information exchanges between the agency and the customer are directed through the first module 120, which is described above. Thus, the third module 140 does not communicate directly with the customer 110, rather the third module 140 communicates with the customer 110 via the first module 120. Otherwise, the operation of system 200 is as described above for system 100 and that operation will not be repeated here. As with system 100, in system 200 the first through fourth modules, which comprise the agency's system which is an online-capable business, may be separate hardware and/or software modules or two or more of the modules may be integrated into one overall computer hardware/software module.

Figure 3A:
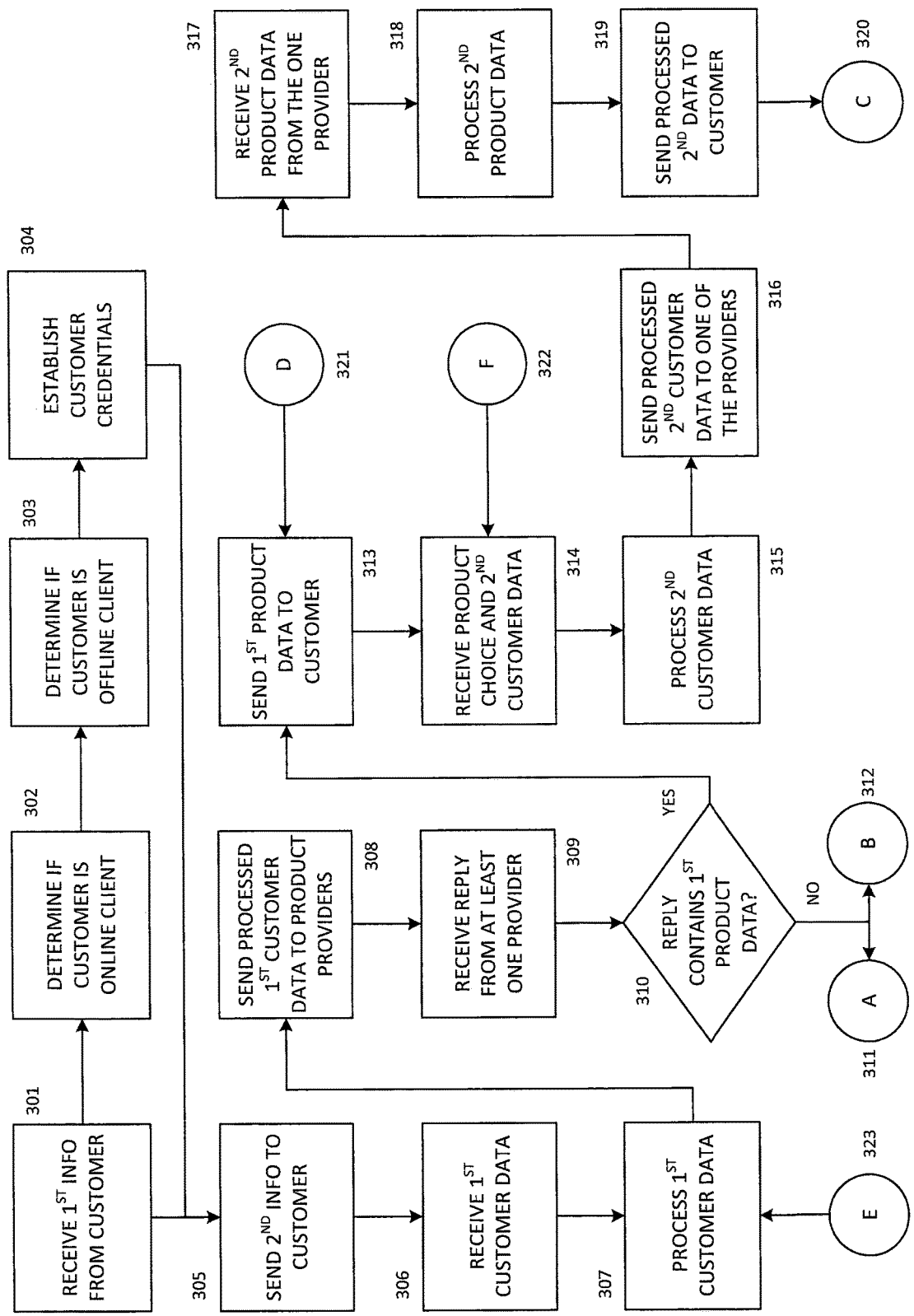
FIGS. 3A, 3B, and 3C are flow diagrams for a method for an online agency according to embodiments of the disclosure.
Figure 3B:
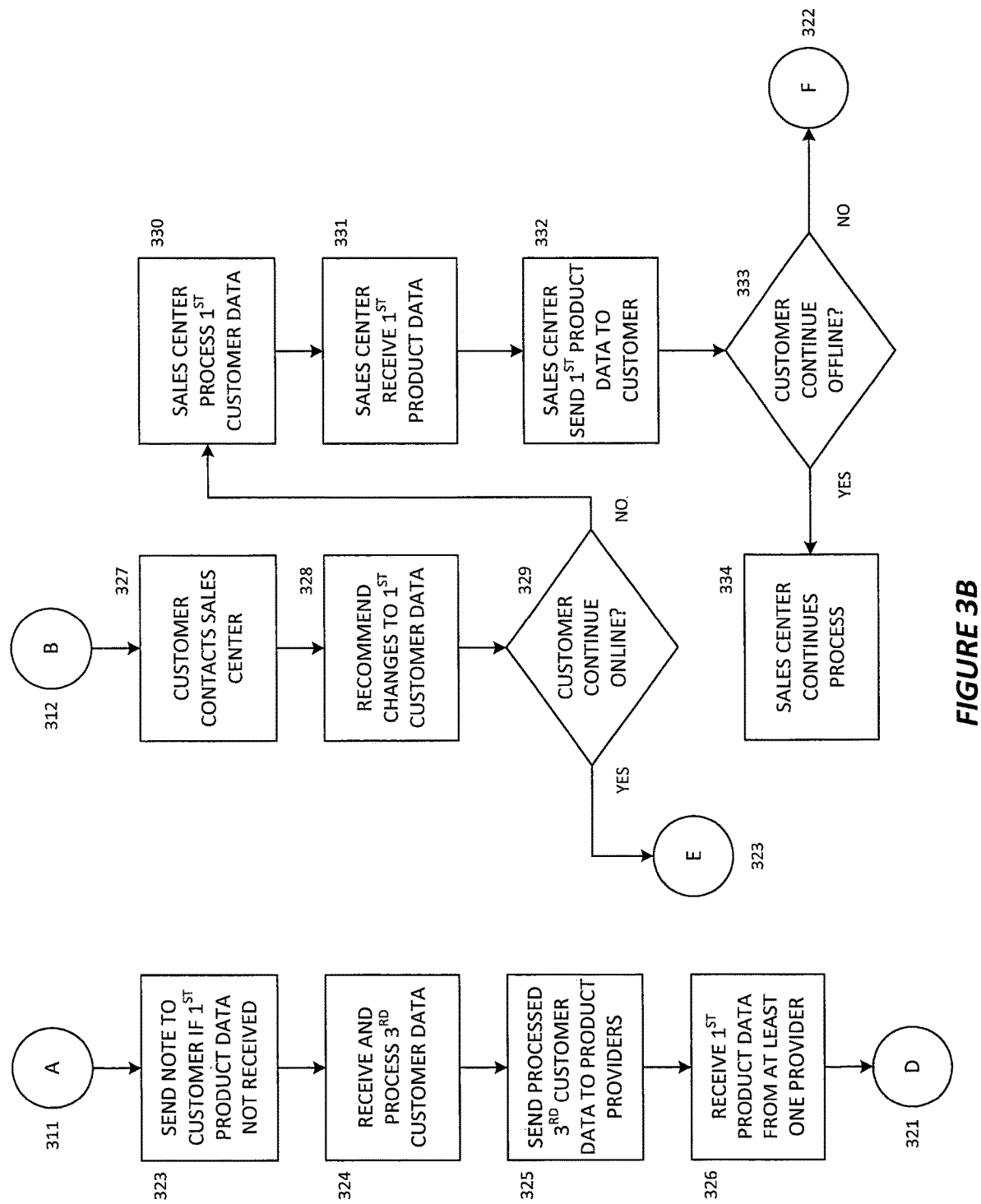
Figure 3C:
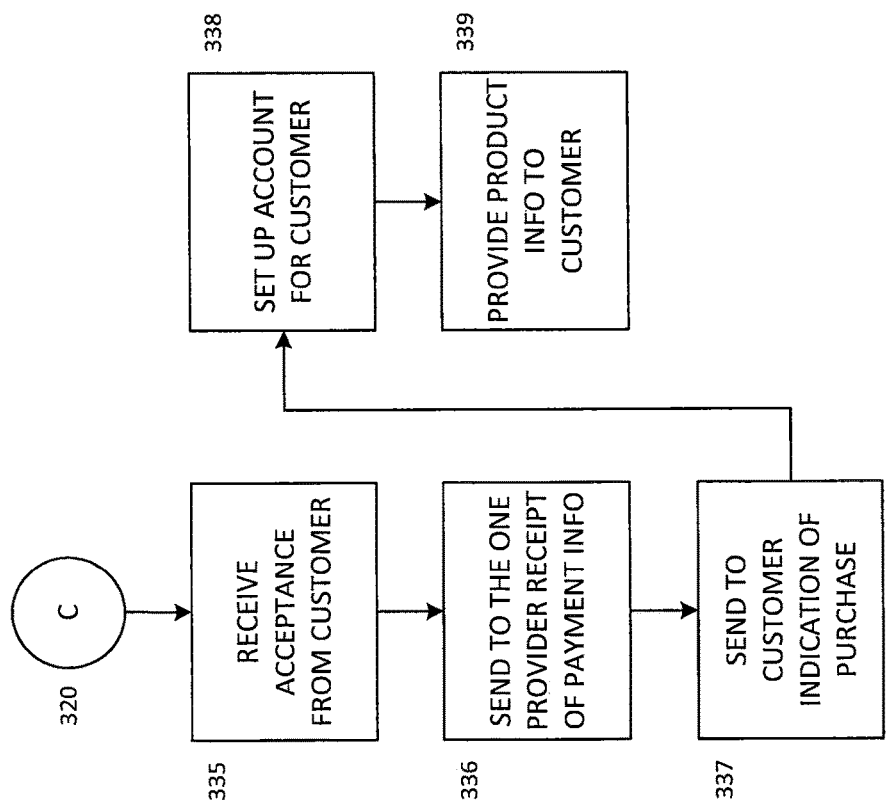

Considering now FIGS. 3A through 3C, flow diagrams are presented for a method for an online agency including methods for providing information from a business/agency, from one or more predetermined product/service providers, to a customer for assisting the customer in choosing and/or purchasing and/or servicing a product or service, according to embodiments of the disclosure. In FIG. 3A, at block 301 an online-capable business receives a first set of information (as described above) from the customer where the first set of information is received via a first computer interface communicating with the customer over a computer network. At block 305, the business provides a second set of information (as described above) to the customer via the first computer interface where the second set of information is based on the received first set of information. At block 306, the business receives a first set of customer data regarding a product/service in which the customer is interested in receiving information about, purchasing, or servicing. At block 307, the business processes, as described above, using a microprocessor, the received first set of customer data as necessary In an embodiment of the present subject matter, the processing of the first set of customer data includes performing a pre-approval determination of the customer for a cross-sell product or service. At block 308 the business sends the first customer data and/or the processed first customer data to one or more product/service providers via a second computer interface. At block 309, the business receives, via the second computer interface, a reply from at least one of the one or more product providers in response to the first customer data and/or the processed first customer data. At block 310, the business determines if the received replies include first product data (as described above) and, if so, processes the received replies as necessary using a microprocessor. At block 313, if the received replies do contain first product data, the business then sends, via the first computer interface, the first product data and/or the processed first product data to the customer. At block 314, the business receives, via the first computer interface, a product choice and a second set of customer data (as described above) regarding the product choice from the customer in response to the first product data. At block 315, the business processes, as necessary using a microprocessor, the second set of customer data. At block 316, the business sends, via the second computer interface, the second set of customer data and/or the processed second set of customer data to the one product provider associated with the product choice. At block 317, the business receives, via the second computer interface, a second set of product data (as described above) from the one product provider associated with the product choice, where the second set of product data is received in response to the second set of customer data and/or the processed second set of customer data. At block 318, the business processes, as necessary using a microprocessor, the second set of product data. At block 319, the business sends to the customer, via the first computer interface, the second set of product data and/or the processed second set of product data. Thus, the business has provided to the customer information from one or more product/service providers regarding a product/service that the customer is interested in where the information will assist the customer in choosing a product/service desired by the customer. Additionally, the above process can be used to provide information to the customer regarding a product/service that the customer is interested in where the information will assist the customer in choosing a follow-on service for a previously-purchased product/service.

Optionally, according to certain embodiments of the present subject matter, the process may continue at block 320 to FIG. 3C. In FIG. 3C, at block 335, the business receives from the customer, via the first computer interface, an acceptance of the second set of product data where the acceptance includes customer payment information for the accepted product/service. At block 336, the business sends to the provider of the accepted product/service, via the second computer interface, an indication of the receipt of the customer payment information from the customer. At block 337, the business sends to the customer, via the first computer interface, an indication of purchase of the product choice (as described above). In an embodiment of the present subject matter, the indication of purchase of the product choice includes an insurance identification card. Thus, the business has provided to the customer information from one or more product/service providers from which the customer has purchased a product/service desired by the customer. Additionally, the above process can be used to provide information to the customer from which the customer has purchased a follow-on service for a previously-purchased product/service.

Optionally, according to certain embodiments of the present subject matter, the process may continue at block 338 where the business sets up an account for the customer with the business and at block 339 where the business provides, via the first computer interface, product information to the customer based on the product choice. The product information may include, but is not limited to, payment reminders, payment deadlines, renewal reminders, renewal deadlines, renewal information, cross-sell opportunities, up-sell opportunities, or combinations thereof. In certain embodiments, the product choice includes a choice of service for an existing policy, such as, but not limited to, a view policy summary, a view policy document, make a payment, add/remove a vehicle (or other property) from a policy, add/remove a driver, receive targeted cross sell offers, etc.

Referring now to FIGS. 3A and 3B, at block 310 of FIG. 3A, in embodiments of the present subject matter, if the business determines that the received replies do not include first product data, the process may be continued at blocks 311 or 312, as described below. For one embodiment of the present subject matter, the process continues at block 311 to FIG. 3B. In FIG. 3B, at block 323, the business sends to the customer, via the first computer interface, a notification that no first product data was received from the product providers. At block 324, the business receives from the customer, via the first computer interface, a third set of customer data regarding the product/service desired by the customer. The business may process the third set of customer data, as necessary using a microprocessor. At block 325, the business sends the third set of customer data and/or the processed third set of customer data to the product providers via the second computer interface. At block 326, the business receives, via the second computer interface, a reply from at least one of the one or more product providers in response to the first customer data and/or the processed first customer data, where the reply includes a first set of product data. In an embodiment of the present subject matter, the business may not receive a reply which includes a first set of product data at which point the process may jump back to block 310 (not shown for sake of clarity). Continuing with the process in FIG. 3B where the reply from at least one of the one or more product providers includes a first set of product data, at block 321 the process continues as shown in FIG. 3A.

Referring again to block 310 of FIG. 3A, in embodiments of the present subject matter, if the business determines that the received replies do not include first product data, the process may be continued at block 312, as described below. For one embodiment of the present subject matter, the process continues at block 312 to FIG. 3B. In FIG. 3B, at block 327, the business receives, at a customer contact sales center of the business, a telephone call from the customer. At block 328, the business, via the sales center, recommends to the customer changes to the first set of customer data. The recommendation is based on the business's knowledge of the requirements and other particulars (including, but not limited to insurance coverage levels, deductible amounts, etc.) of the predetermined product/service providers. At block 329, the customer determines if he/she would like to continue the process through an online channel (shown as continuing to block 323) or continue through an offline channel such as the telephone channel (shown as continuing to block 330).

If the customer opts to continue the process through an online channel, the process continues at block 323 to FIG. 3A. In FIG. 3A, at block 307, the business processes, as necessary using a microprocessor as described above, the modified first set of customer data from the recommendations at block 328 in FIG. 3B. The process then continues on to block 308 in FIG. 3A, as described above. If the customer opts to continue the process through an offline channel, such as the telephone channel, the process continues at block 330 in FIG. 3B. At block 330, the sales center processes the modified first set of customer data (the modifications as recommended at block 328), described above, and sends the modified first set of customer data to the one or more product/service providers. At block 331, the sales center receives a reply from at least one of the one or more product/service providers in response to the modified/processed first set of customer data, where the reply includes a first set of product data. In an embodiment of the present subject matter, the sales center may not receive a reply which includes a first set of product data at which point the process may jump back to block 310 (not shown for sake of clarity) or block 328 (not shown for clarity) and continue the process. If the sales center determines that the received replies include first product data, the sales center informs/sends to the customer the first set of product data processed as necessary using a microprocessor. At block 333, the customer determines if he/she would like to continue the process through an offline channel (shown as continuing to block 334) or continue through an online channel (shown as continuing to block 322).

If the customer opts to continue the process using an offline channel, such as the telephone channel, at block 334 the sales center continues the process described above via the offline channel. If the customer opts to continue the process using an online channel, the process continues at block 322 to FIG. 3A. In FIG. 3A, at block 314, the business receives, via the first computer interface, a product choice and a second set of customer data regarding the product choice from the customer in response to the first product data. The process then continues on to block 315 in FIG. 3A, as described above.

Referring again to FIG. 3A, in an embodiment of the present subject matter, the business, upon receiving the first set of information from the customer at block 301, at block 302 the business determines if the customer is an existing online client of the business. If the customer is an existing online client of the business, then the customer will have credentials with the business which will enable the customer to stop and restart the process in FIGS. 3A through 3C without losing any data, so long as the first set of information from the customer can be verified by the business. At block 303, the business determines if the customer is not an existing online client of the business or if the first set of information received from the customer cannot be verified by the business. Additionally, the business determines if the customer is an existing offline client of the business. At block 304, if the customer is not an online client of the business but is an offline client of the business, and the first set of information from the customer can be verified by the business, the business establishes customer credentials which will enable the customer to stop and restart the process in FIGS. 3A through 3C without losing any data. If the customer is neither an online or offline client of the business or if the first set of information from the customer cannot be verified, the business flags the customer as a pending customer. The process then continues to block 305, as described above.

Figure 4A:
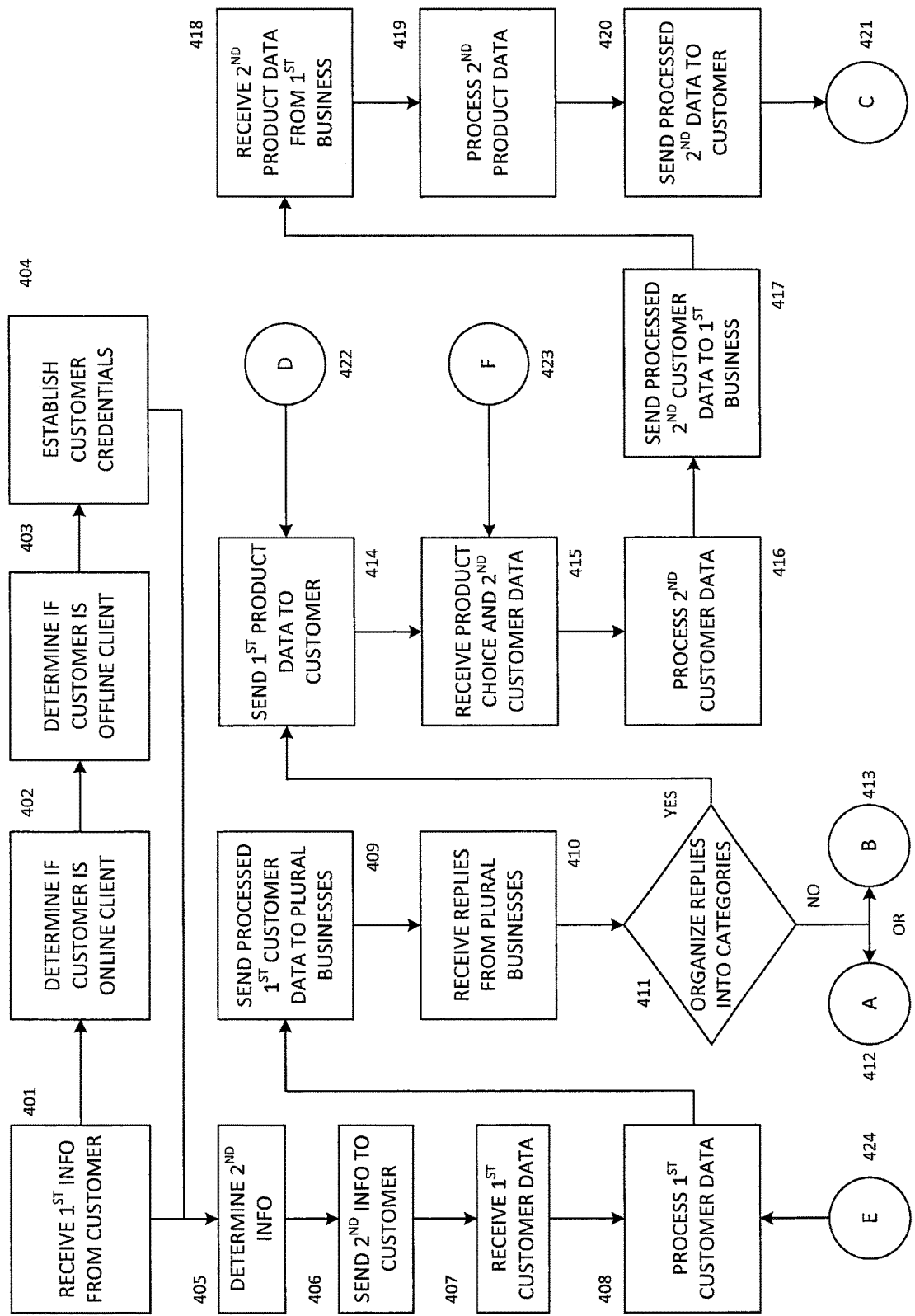
FIGS. 4A, 4B, and 4C are flow diagrams for a method for an online agency according to embodiments of the disclosure.
Figure 4B:
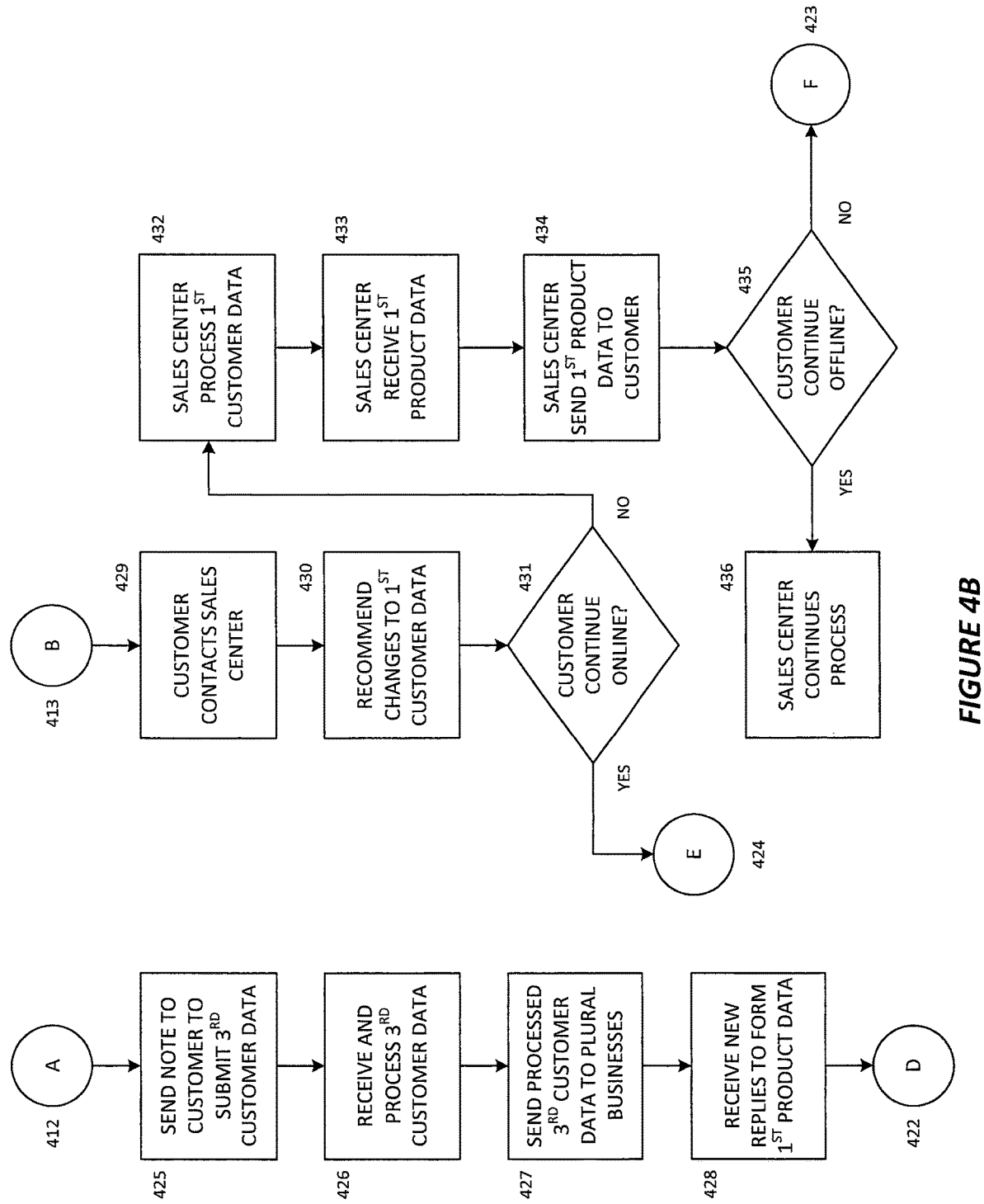
Figure 4C:
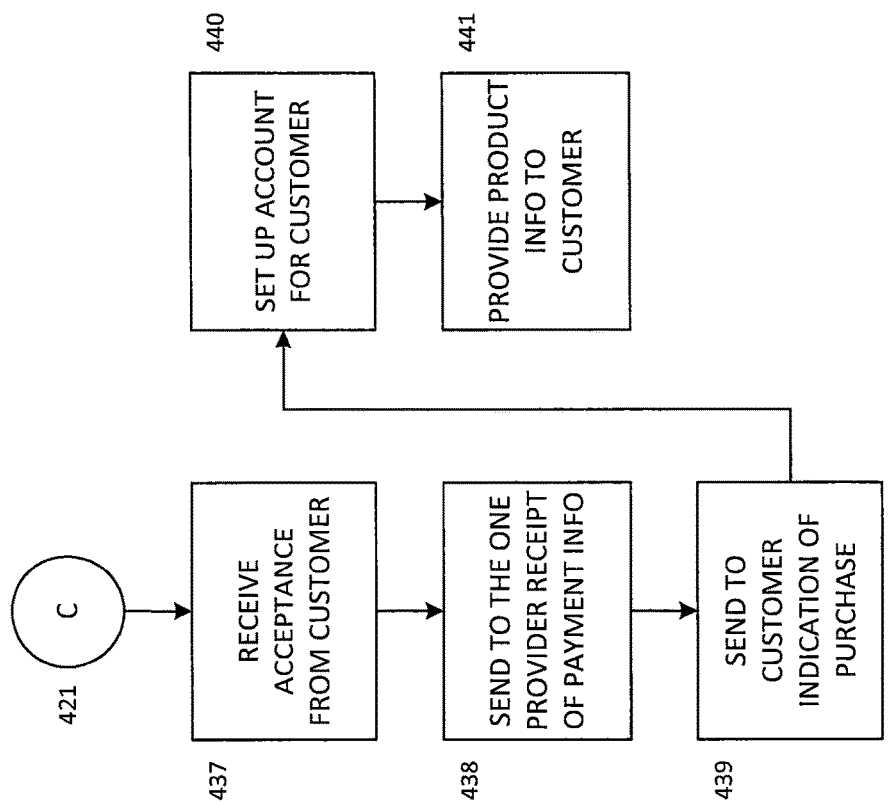

Considering now FIGS. 4A through 4C, flow diagrams are presented for a method for an online agency including methods for providing information from a predetermined plurality of competing businesses to a customer for assisting the customer in choosing a product and/or service from one of the competing businesses, according to embodiments of the disclosure. In FIG. 4A, at block 401 an online-capable business or agency receives a first set of information (as described above) from the customer where the first set of information is received via a first computer interface communicating with the customer over a computer network. At block 405, the agency determines, using a microprocessor, a second set of information based at least in part on the received first set of information and on data required by at least one of the predetermined plurality of competing businesses. At block 406, the agency provides a second set of information (as described above) to the customer via the first computer interface where the second set of information is based on the received first set of information. At block 407, the agency receives a first set of customer data regarding a product/service in which the customer is interested in receiving information about, purchasing, or servicing. At block 408, the agency processes, as described above, using a microprocessor (which may be, but is not necessarily, the same microprocessor used in block 405—the same is true for other microprocessors recited herein), the received first set of customer data as necessary. In an embodiment of the present subject matter, the processing of the first set of customer data includes performing a pre-approval determination of the customer for a cross-sell product or service. At block 409 the agency sends the first customer data and/or the processed first customer data to one or more of the predetermined plurality of competing businesses via a second computer interface. At block 410, the agency receives, via the second computer interface, a reply from at least one of the predetermined plurality of competing businesses in response to the first customer data and/or the processed first customer data. At block 411, the agency processes, using a microprocessor, the received replies which includes organizing the replies into predetermined categories to thereby form the first product data. As a non-limiting example, the predetermined categories may be insurance coverage amounts for each person involved in an automobile accident and may also include a total insurance amount per accident. For example, a first category may be $50,000 coverage per person and $100,000 coverage per accident. A second category may be $100,000 coverage per person and $100,000 coverage per accident. A third category may be $250,000 coverage per person and $500,000 coverage per accident. Since each of the predetermined plurality of competing businesses may offer different coverage levels, the agency attempts to fit the coverage levels offered by the businesses into broad categories thereby making it easier on the customer in deciding which insurance package to purchase. One of skill in the art will readily understand that there are many variables involved with the packages offered by each of the predetermined plurality of competing businesses and furthermore that there are additional variables the agency must take into account in attempting to present to the customer a similar package from each of the predetermined plurality of competing businesses. Thus, the customer will be in a better position to make an informed comparison between the offered products/services.

Continuing with block 411, if the agency can organize the received replies into the predetermined categories, then at block 414, the agency then sends, via the first computer interface, the first product data and/or the processed first product data to the customer. At block 415, the agency receives, via the first computer interface, a product choice and a second set of customer data (as described above) regarding the product choice from the customer in response to the first product data. At block 416, the agency processes, as necessary using a microprocessor, the second set of customer data. At block 417, the agency sends, via the second computer interface, the second set of customer data and/or the processed second set of customer data to one of the predetermined plurality of competing businesses associated with the product choice. At block 418, the agency receives, via the second computer interface, a second set of product data (as described above) from the one business associated with the product choice, where the second set of product data is received in response to the second set of customer data and/or the processed second set of customer data. At block 419, the agency processes, as necessary using a microprocessor, the second set of product data. At block 420, the agency sends to the customer, via the first computer interface, the second set of product data and/or the processed second set of product data. Thus, the agency has provided to the customer information from the predetermined plurality of competing businesses regarding a product/service that the customer is interested in where the information will assist the customer in choosing a product/service desired by the customer. Additionally, the above process can be used to provide information to the customer regarding a product/service that the customer is interested in where the information will assist the customer in choosing a follow-on service for a previously-purchased product/service.

Optionally, according to certain embodiments of the present subject matter, the process may continue at block 421 to FIG. 4C. In FIG. 4C, at block 437, the agency receives from the customer, via the first computer interface, an acceptance of the second set of product data where the acceptance includes customer payment information for the accepted product/service. At block 438, the agency sends to the business providing the accepted product/service, via the second computer interface, an indication of the receipt of the customer payment information from the customer. At block 439, the agency sends to the customer, via the first computer interface, an indication of purchase of the product choice (as described above). In an embodiment of the present subject matter, the indication of purchase of the product choice includes an insurance identification card. Thus, the agency has provided to the customer information from the predetermined plurality of competing businesses from which the customer has purchased a product/service desired by the customer. Additionally, the above process can be used to provide information to the customer from which the customer has purchased a follow-on service for a previously-purchased product/service.

Optionally, according to certain embodiments of the present subject matter, the process may continue at block 440 where the agency sets up an account for the customer with the agency and at block 441 where the agency provides, via the first computer interface, product information to the customer based on the product choice. The product information may include, but is not limited to, payment reminders, payment deadlines, renewal reminders, renewal deadlines, renewal information, cross-sell opportunities, up-sell opportunities, or combinations thereof. In certain embodiments, the product choice includes a choice of service for an existing policy, such as, but not limited to, a view policy summary, a view policy document, make a payment, add/remove a vehicle (or other property) from a policy, add/remove a driver, receive targeted cross sell offers, etc.

Referring now to FIGS. 4A and 4B, at block 411 of FIG. 4A, in embodiments of the present subject matter, if the agency determines that the received replies cannot be organized into the predetermined categories, the process may be continued at blocks 412 or 413, as described below. For one embodiment of the present subject matter, the process continues at block 412 to FIG. 4B. In FIG. 4B, at block 425, the business sends to the customer, via the first computer interface, a notification to submit a third set of customer data since the agency cannot organize the replies from the predetermined plurality of competing businesses based on the input received up to this point by the agency from the customer. At block 426, the agency receives from the customer, via the first computer interface, a third set of customer data regarding the product/service desired by the customer. The agency may process the third set of customer data, as necessary using a microprocessor. At block 427, the business sends the third set of customer data and/or the processed third set of customer data to the predetermined plurality of competing businesses via the second computer interface. At block 428, the agency receives, via the second computer interface, new replies from the predetermined plurality of competing businesses in response to the third customer data and/or the processed third customer data, where the reply includes a first set of product data. In an embodiment of the present subject matter, the agency may not receive replies which are capable of being organized into categories as described above for block 411 at which point the process may jump back to block 411 (not shown for sake of clarity). Continuing with the process in FIG. 4B where the reply from the predetermined plurality of competing businesses can be organized into predetermined categories by the agency, at block 422 the process continues as shown in FIG. 4A.

Referring again to block 411 of FIG. 4A, in embodiments of the present subject matter, if the agency determines that the received replies cannot be organized into the agency's predetermined categories, the process may be continued at block 413, as described below. For one embodiment of the present subject matter, the process continues at block 413 to FIG. 4B. In FIG. 4B, at block 429, the agency receives, at a customer contact sales center of the business, a telephone call from the customer. At block 430, the agency, via the sales center, recommends to the customer changes to the first set of customer data. The recommendation is based on the agency's knowledge of the requirements and other particulars (including, but not limited to insurance coverage levels, deductible amounts, etc.) of the predetermined plurality of competing businesses. At block 431, the customer determines if he/she would like to continue the process through an online channel (shown as continuing to block 424) or continue through an offline channel such as the telephone channel (shown as continuing to block 432).

If the customer opts to continue the process through an online channel, the process continues at block 424 to FIG. 4A. In FIG. 4A, at block 408, the agency processes, as necessary using a microprocessor as described above, the modified first set of customer data from the recommendations at block 430 in FIG. 4B. The process then continues on to block 409 in FIG. 4A, as described above. If the customer opts to continue the process through an offline channel, such as the telephone channel, the process continues at block 432 in FIG. 4B. At block 432, the sales center processes the modified first set of customer data (the modifications as recommended at block 430), described above, and sends the modified first set of customer data to the predetermined plurality of competing businesses. At block 433, the sales center receives a reply from at least one of the predetermined plurality of competing businesses in response to the modified/processed first set of customer data, where the reply includes a first set of product data. In an embodiment of the present subject matter, the sales center may not receive replies which are capable of being organized into predetermined categories, as described above, at which point the process may jump back to block 411 (not shown for sake of clarity) or block 430 (not shown for sake of clarity) and continue the process. If the sales center determines that the received replies are capable of being organized into predetermined categories, the sales center informs/sends to the customer the first set of product data processed as necessary using a microprocessor. At block 435, the customer determines if he/she would like to continue the process through an offline channel (shown as continuing to block 436) or continue through an online channel (shown as continuing to block 423).

If the customer opts to continue the process using an offline channel, such as the telephone channel, at block 436 the sales center continues the process described above via the offline channel. If the customer opts to continue the process using an online channel, the process continues at block 423 to FIG. 4A. In FIG. 4A, at block 415, the agency receives, via the first computer interface, a product choice and a second set of customer data regarding the product choice from the customer in response to the first product data. The process then continues on to block 416 in FIG. 4A, as described above.

Referring again to FIG. 4A, in an embodiment of the present subject matter, the agency, upon receiving the first set of information from the customer at block 401, at block 402 the agency determines if the customer is an existing online client of the agency. If the customer is an existing online client of the agency, then the customer will have credentials with the agency which will enable the customer to stop and restart the process in FIGS. 4A through 4C without losing any data, so long as the first set of information from the customer can be verified by the agency. At block 403, the agency determines if the customer is not an existing online client of the agency or if the first set of information received from the customer cannot be verified by the agency. Additionally, the agency determines if the customer is an existing offline client of the agency. At block 404, if the customer is not an online client of the agency but is an offline client of the agency, and the first set of information from the customer can be verified by the agency, the agency establishes customer credentials which will enable the customer to stop and restart the process in FIGS. 4A through 4C without losing any data. If the customer is neither an online or offline client of the agency or if the first set of information from the customer cannot be verified, the agency flags the customer as a pending customer. The process then continues to block 405, as described above.

Figure 5A:
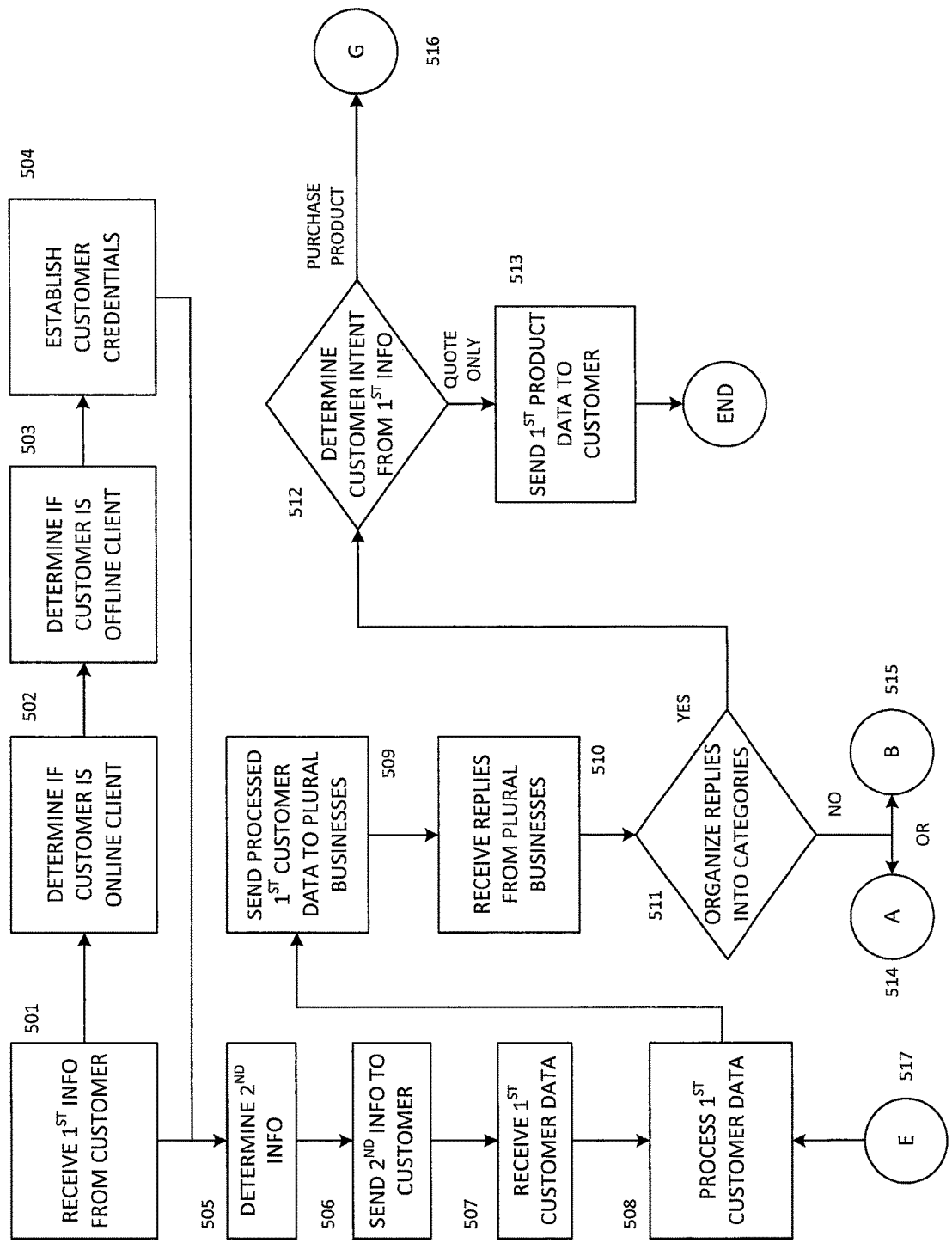

Considering now FIGS. 5A through 5D, flow diagrams are presented for a method for an online agency including methods for providing information from a predetermined plurality of competing businesses to a customer for assisting the customer in choosing a product and/or service from one of the competing businesses, according to embodiments of the disclosure. In FIG. 5A, at block 501 an online-capable business or agency receives a first set of information (as described above) from the customer where the first set of information is received via a first computer interface communicating with the customer over a computer network. At block 505, the agency determines, using a microprocessor, a second set of information based at least in part on the received first set of information and on data required by at least one of the predetermined plurality of competing businesses. At block 506, the agency provides a second set of information (as described above) to the customer via the first computer interface where the second set of information is based on the received first set of information. At block 507, the agency receives a first set of customer data regarding a product/service in which the customer is interested in receiving information about, purchasing, or servicing. At block 508, the agency processes, as described above, using a microprocessor (which may be, but is not necessarily, the same microprocessor used in block 505—the same is true for other microprocessors recited herein), the received first set of customer data as necessary. In an embodiment of the present subject matter, the processing of the first set of customer data includes performing a pre-approval determination of the customer for a cross-sell product or service. At block 509 the agency sends the first customer data and/or the processed first customer data to one or more of the predetermined plurality of competing businesses via a second computer interface. At block 510, the agency receives, via the second computer interface, a reply from at least one of the predetermined plurality of competing businesses in response to the first customer data and/or the processed first customer data. At block 511, the agency processes, using a microprocessor, the received replies which includes organizing the replies into predetermined categories to thereby form the first product data. As a non-limiting example, the predetermined categories may be insurance coverage amounts for each person involved in an automobile accident and may also include a total insurance amount per accident. For example, a first category may be $50,000 coverage per person and $100,000 coverage per accident. A second category may be $100,000 coverage per person and $100,000 coverage per accident. A third category may be $250,000 coverage per person and $500,000 coverage per accident. Since each of the predetermined plurality of competing businesses may offer different coverage levels, the agency attempts to fit the coverage levels offered by the businesses into broad categories thereby making it easier on the customer in deciding which insurance package to purchase. One of skill in the art will readily understand that there are many variables involved with the packages offered by each of the predetermined plurality of competing businesses and furthermore that there are additional variables the agency must take into account in attempting to present to the customer a similar package from each of the predetermined plurality of competing businesses. Thus, the customer will be in a better position to make an informed comparison between the offered products/services.

Continuing with block 511, if the agency can organize the received replies into the predetermined categories, then at block 512 the agency determines from the first set of information, using a microprocessor, the intent of the customer, i.e., whether the customer intends to purchase the product/service from one of the predetermined plurality of competing businesses or whether the customer intends to only obtain one or more quotes for the product/service from the predetermined plurality of competing businesses. This determination can simply be an indication (e.g., a radio button clicked, a pull-down menu result set by the customer, or any other similar indicator) in the first set of information If the agency determines at block 512 that the customer's intent is to obtain one or more quotes, then at block 513 the agency sends, via the first computer interface, the first product data and/or the processed first product data to the customer. The process may now end.

Figure 5B:
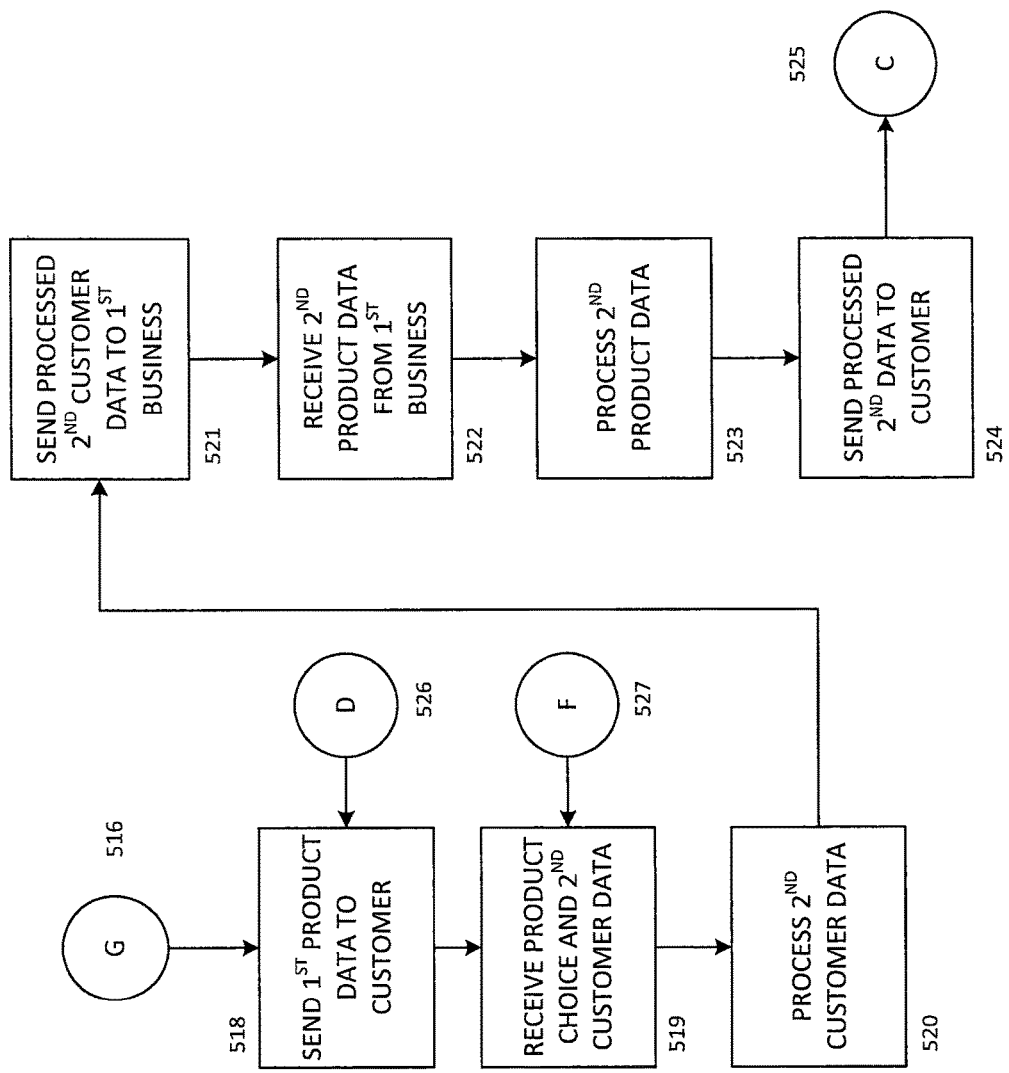

If at block 512 the agency determines that the customer's intent is to purchase a product/service from one of the predetermined plurality of competing businesses, then the process proceeds to block 516 to FIG. 5B. In FIG. 5B, at block 518, the agency sends, via the first computer interface, the first product data and/or the processed first product data to the customer. At block 519, the agency receives, via the first computer interface, a product choice and a second set of customer data (as described above) regarding the product choice from the customer in response to the first product data. At block 520, the agency processes, as necessary using a microprocessor, the second set of customer data. At block 521, the agency sends, via the second computer interface, the second set of customer data and/or the processed second set of customer data to one of the predetermined plurality of competing businesses associated with the product choice. At block 522, the agency receives, via the second computer interface, a second set of product data (as described above) from the one business associated with the product choice, where the second set of product data is received in response to the second set of customer data and/or the processed second set of customer data. At block 523, the agency processes, as necessary using a microprocessor, the second set of product data. At block 524, the agency sends to the customer, via the first computer interface, the second set of product data and/or the processed second set of product data. Thus, the agency has provided to the customer information from the predetermined plurality of competing businesses regarding a product/service that the customer is interested in where the information will assist the customer in choosing a product/service desired by the customer. Additionally, the above process can be used to provide information to the customer regarding a product/service that the customer is interested in where the information will assist the customer in choosing a follow-on service for a previously-purchased product/service.

Optionally, according to certain embodiments of the present subject matter, the process may continue at block 525 to FIG. 5D. In FIG. 5D, at block 540, the agency receives from the customer, via the first computer interface, an acceptance of the second set of product data where the acceptance includes customer payment information for the accepted product/service. At block 541, the agency sends to the business providing the accepted product/service, via the second computer interface, an indication of the receipt of the customer payment information from the customer. At block 542, the agency sends to the customer, via the first computer interface, an indication of purchase of the product choice (as described above). In an embodiment of the present subject matter, the indication of purchase of the product choice includes an insurance identification card. Thus, the agency has provided to the customer information from the predetermined plurality of competing businesses from which the customer has purchased a product/service desired by the customer. Additionally, the above process can be used to provide information to the customer from which the customer has purchased a follow-on service for a previously-purchased product/service.

Optionally, according to certain embodiments of the present subject matter, the process may continue at block 543 where the agency sets up an account for the customer with the agency and at block 544 where the agency provides, via the first computer interface, product information to the customer based on the product choice. The product information may include, but is not limited to, payment reminders, payment deadlines, renewal reminders, renewal deadlines, renewal information, cross-sell opportunities, up-sell opportunities, or combinations thereof. In certain embodiments, the product choice includes a choice of service for an existing policy, such as, but not limited to, a view policy summary, a view policy document, make a payment, add/remove a vehicle (or other property) from a policy, add/remove a driver, receive targeted cross sell offers, etc.

Figure 5C:
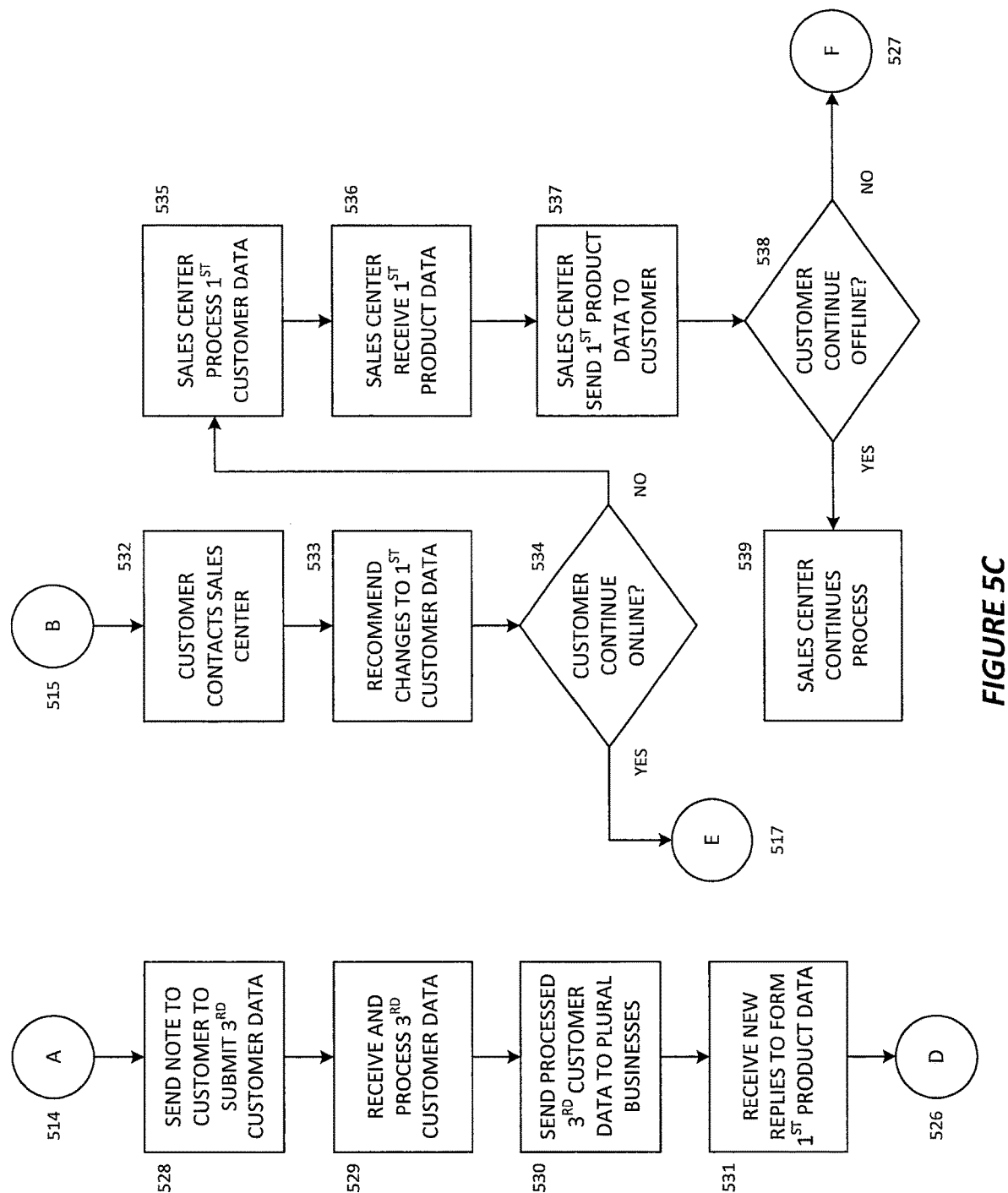

Referring now to FIGS. 5A through 5C, at block 511 of FIG. 5A, in embodiments of the present subject matter, if the agency determines that the received replies cannot be organized into the predetermined categories, the process may be continued at blocks 514 or 515, as described below. For one embodiment of the present subject matter, the process continues at block 514 to FIG. 5C. In FIG. 5C, at block 528, the business sends to the customer, via the first computer interface, a notification to submit a third set of customer data since the agency cannot organize the replies from the predetermined plurality of competing businesses based on the input received up to this point by the agency from the customer. At block 529, the agency receives from the customer, via the first computer interface, a third set of customer data regarding the product/service desired by the customer. The agency may process the third set of customer data, as necessary using a microprocessor. At block 530, the business sends the third set of customer data and/or the processed third set of customer data to the predetermined plurality of competing businesses via the second computer interface. At block 531, the agency receives, via the second computer interface, new replies from the predetermined plurality of competing businesses in response to the third customer data and/or the processed third customer data, where the reply includes a first set of product data. In an embodiment of the present subject matter, the agency may not receive replies which are capable of being organized into categories as described above for block 511 at which point the process may jump back to block 511 (not shown for sake of clarity). Continuing with the process in FIG. 5C where the reply from the predetermined plurality of competing businesses can be organized into predetermined categories by the agency, at block 526 the process continues as shown in FIG. 5B.

Referring again to block 511 of FIG. 5A, in embodiments of the present subject matter, if the agency determines that the received replies cannot be organized into the agency's predetermined categories, the process may be continued at block 515, as described below. For one embodiment of the present subject matter, the process continues at block 515 to FIG. 5C. In FIG. 5C, at block 532, the agency receives, at a customer contact sales center of the business, a telephone call from the customer. At block 533, the agency, via the sales center, recommends to the customer changes to the first set of customer data. The recommendation is based on the agency's knowledge of the requirements and other particulars (including, but not limited to insurance coverage levels, deductible amounts, etc.) of the predetermined plurality of competing businesses. At block 534, the customer determines if he/she would like to continue the process through an online channel (shown as continuing to block 517) or continue through an offline channel such as the telephone channel (shown as continuing to block 535).

If the customer opts to continue the process through an online channel, the process continues at block 517 to FIG. 5A. In FIG. 5A, at block 508, the agency processes, as necessary using a microprocessor as described above, the modified first set of customer data from the recommendations at block 533 in FIG. 5C. The process then continues on to block 509 in FIG. 5A, as described above. If the customer opts to continue the process through an offline channel, such as the telephone channel, the process continues at block 535 in FIG. 5C. At block 535, the sales center processes the modified first set of customer data (the modifications as recommended at block 533), described above, and sends the modified first set of customer data to the predetermined plurality of competing businesses. At block 536, the sales center receives a reply from at least one of the predetermined plurality of competing businesses in response to the modified/processed first set of customer data, where the reply includes a first set of product data. In an embodiment of the present subject matter, the sales center may not receive replies which are capable of being organized into predetermined categories, as described above, at which point the process may jump back to block 511 (not shown for sake of clarity) or block 533 (not shown for sake of clarity) and continue the process. If the sales center determines that the received replies are capable of being organized into predetermined categories, the sales center informs/sends to the customer the first set of product data processed as necessary using a microprocessor. At block 538, the customer determines if he/she would like to continue the process through an offline channel (shown as continuing to block 539) or continue through an online channel (shown as continuing to block 527).

If the customer opts to continue the process using an offline channel, such as the telephone channel, at block 539 the sales center continues the process described above via the offline channel. If the customer opts to continue the process using an online channel, the process continues at block 527 to FIG. 5B. In FIG. 5B, at block 519, the agency receives, via the first computer interface, a product choice and a second set of customer data regarding the product choice from the customer in response to the first product data. The process then continues on to block 520 in FIG. 5B, as described above.

Referring again to FIG. 5A, in an embodiment of the present subject matter, the agency, upon receiving the first set of information from the customer at block 501, at block 502 the agency determines if the customer is an existing online client of the agency. If the customer is an existing online client of the agency, then the customer will have credentials with the agency which will enable the customer to stop and restart the process in FIGS. 5A through 5D without losing any data, so long as the first set of information from the customer can be verified by the agency. At block 503, the agency determines if the customer is not an existing online client of the agency or if the first set of information received from the customer cannot be verified by the agency. Additionally, the agency determines if the customer is an existing offline client of the agency. At block 504, if the customer is not an online client of the agency but is an offline client of the agency, and the first set of information from the customer can be verified by the agency, the agency establishes customer credentials which will enable the customer to stop and restart the process in FIGS. 5A through 5D without losing any data. If the customer is neither an online or offline client of the agency or if the first set of information from the customer cannot be verified, the agency flags the customer as a pending customer. The process then continues to block 505, as described above.

While preferred embodiments of the present disclosure have been described, it is to be understood that the embodiments described are illustrative only and that the scope of the invention is to be defined solely by the appended claims when accorded a full range of equivalents, many variations and modifications naturally occurring to those of skill in the art from a perusal hereof.

We claim:

1. A method for concurrently interacting with a plurality of product providers, the method comprising the steps of:
   (a) receiving from a customer a first set of information regarding a product, wherein the first set of information is received via a first computer interface communicating with the customer over a computer network;
   (b) retrieving from a database, using a microprocessor, a second set of information based at least in part on the received first set of information and on data required by at least one of a predetermined plurality of competing product providers, wherein each one of the plurality of product providers sells the product;
   (c) providing, via said first computer interface, the second set of information to the customer;
   (d) receiving, via said first computer interface, first customer data regarding said product, wherein the first customer data is based at least in part on the second set of information;
   (e) processing, using said microprocessor, the first customer data;
   (f) sending concurrently, via a second computer interface, the processed first customer data to each of the plurality of product providers;
   (g) receiving concurrently, via said second computer interface, a reply from each of the plurality of product providers, wherein the replies are in response to the processed first customer data;
   (h) processing, using the microprocessor, the received replies wherein the processing includes organizing the replies into predetermined categories to thereby form a first product data;
   (i) sending, via said first computer interface, the first product data to said customer;
   (j) receiving, via said first computer interface, a product choice and second customer data regarding the product choice from the customer in response to said first product data, wherein the product chosen is associated with a first product provider of the plurality of product providers;
   (k) processing, using said microprocessor, the product choice and the second customer data to thereby form a processed second customer data;
   (l) sending, via said second computer interface, the processed second customer data to the first product provider;
   (m) receiving from the first product provider, via the second computer interface, second product data in response to the processed second customer data;
   (n) processing, using said microprocessor, the second product data; and
   (o) sending the processed second data, via said first computer interface, to the customer.

2. The method of claim 1 further comprising the steps of:
   (p) receiving from the customer an acceptance of the second product data including customer payment information;
   (q) sending to the one product provider an indication of receipt of the customer payment information; and
   (r) sending to the customer an indication of purchase of the product choice.

3. The method of claim 2 further comprising the steps of:
   (s) setting up an account for the customer with the first product provider; and
   (t) providing product information to the customer based on the product choice.

4. The method of claim 3 wherein the product information is selected from the group consisting of: payment reminders, payment deadlines, renewal reminders, renewal information, cross-sell opportunities, up-sell opportunities, and combinations thereof.

5. The method of claim 1 wherein the first customer data comprises insurance coverage information.

6. The method of claim 5 wherein the processed first customer data includes a first modification to the first customer data wherein the first modification is based on a first predetermined information for at least one of the product providers, and
   wherein the first product data includes an insurance quote based on the processed first customer data, and
   wherein the product choice includes a selection of an insurance quote from the one product provider, and
   wherein the second customer data includes specific information provided by the customer wherein the specific information is required by the one product provider for the product choice, and
   wherein the second processed customer data includes a second modification to the second customer data wherein the second modification is based on a second predetermined information for the one product provider, and
   wherein the second product data includes insurance policy information for the product choice.

7. The method of claim 1 wherein the first customer data comprises post-purchase insurance service information.

8. The method of claim 7 wherein the post-purchase insurance service information is selected from the group consisting of: a request for insurance of a second product, a request for insurance for a third person, and combinations thereof.

9. The method of claim 1 wherein the step of processing the first customer data includes performing a pre-approval determination of the customer for a cross-sell product.

10. The method of claim 1 wherein the step of providing the second set of information to the customer includes providing a template of fields of information for the first customer data wherein at least one field of the template is pre-filled with information from a database.

11. The method of claim 1 further comprising the steps of:
    (p) determining if the customer is an online client of the first product provider;
    (q) determining a status of the customer when the customer is not a current online client of the first product provider or when said first set of information is not verified by the first product provider, including determining if the customer is an offline client of the first product provider and when it is determined that the customer is an off-line client of the first product provider, presenting a first content to the customer, otherwise flagging the customer as a pending customer; and
    (r) establishing customer credentials which allow the customer to save a third set of information so that the customer may later resume choosing a product via an online channel, an offline channel, a telephonic channel, and combinations thereof.

12. The method of claim 1 wherein when the processing in step (h) is incapable of organizing any of the replies into the predetermined categories:
   (h)(i) sending to the customer a notification to submit third customer data;
   (h)(ii) receiving and processing the third customer data and sending the processed third customer data to each of the plurality of product providers; and
   (h)(iii) receiving new replies from each of the plurality of product providers to thereby form the first product data.

13. The method of claim 1 wherein when the processing in step (h) is incapable of organizing any of the replies into the predetermined categories:
   (h)(i) receiving at a customer contact sales center a telephone call from the customer;
   (h)(ii) recommending to the customer changes to the first customer data; and
   (h)(iii) processing the first customer data and providing the customer with first product data.

* * * * *